US006538666B1

(12) United States Patent
Ozawa et al.

(10) Patent No.: US 6,538,666 B1
(45) Date of Patent: Mar. 25, 2003

(54) IMAGE PROCESSING DEVICE USING SPEECH RECOGNITION TO CONTROL A DISPLAYED OBJECT

(75) Inventors: Muneaki Ozawa, Shibuya-ku (JP); Koji Mitsunari, Kyoto (JP); Takeshi Nagareda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/458,671

(22) Filed: Dec. 10, 1999

(30) Foreign Application Priority Data

Dec. 11, 1998 (JP) ............................ 10-353612

(51) Int. Cl.[7] ............................................. G10L 15/22
(52) U.S. Cl. ...................... 345/728; 704/275; 345/716
(58) Field of Search .................. 704/275; 345/716, 345/728

(56) References Cited

U.S. PATENT DOCUMENTS

| | | | | |
|---|---|---|---|---|
| 4,333,152 A | * | 6/1982 | Best | 345/716 |
| 4,540,176 A | * | 9/1985 | Baer | 463/37 |
| 4,569,026 A | * | 2/1986 | Best | 345/716 |
| 4,704,696 A | | 11/1987 | Reimer et al. | |
| 5,027,406 A | * | 6/1991 | Roberts et al. | 704/241 |
| 5,583,965 A | * | 12/1996 | Douma et al. | 704/275 |
| 5,651,678 A | * | 7/1997 | Phillips | 434/170 |
| 5,774,859 A | * | 6/1998 | Houser et al. | 704/275 |
| 5,777,614 A | | 7/1998 | Ando et al. | |

FOREIGN PATENT DOCUMENTS

| | | |
|---|---|---|
| EP | 0 745 944 | 12/1996 |
| EP | 0 747 881 | 12/1996 |
| JP | 07-219587 | 12/1995 |
| JP | 9-230890 | 9/1997 |
| JP | 09-230890 | 1/1998 |
| JP | 09-297595 | 3/1998 |

* cited by examiner

Primary Examiner—Tālivaldis Ivars Šmits
(74) Attorney, Agent, or Firm—Nixon & Vanderhye P.C.

(57) ABSTRACT

An image processing device which changes the way speech recognition results are processed as the program progresses. A video game machine body 10 causes a television receiver 30 to display given images and to output given sounds in accordance with a game program stored in a ROM cartridge 20. When a player enters a speech from a microphone 60, a speech recognition unit 50 recognizes a word corresponding to the speech and sends the result to the video game machine body 10. The video game machine body 10 causes the state of a dialogue partner object displayed on the television receiver 30 to change on the basis of the recognized result received from the speech recognition unit 50. The relation between the recognition result and the control of the displayed dialogue partner object is changed as the program progresses, which gives variety to the game and makes it more amusing.

14 Claims, 25 Drawing Sheets

F I G. 1
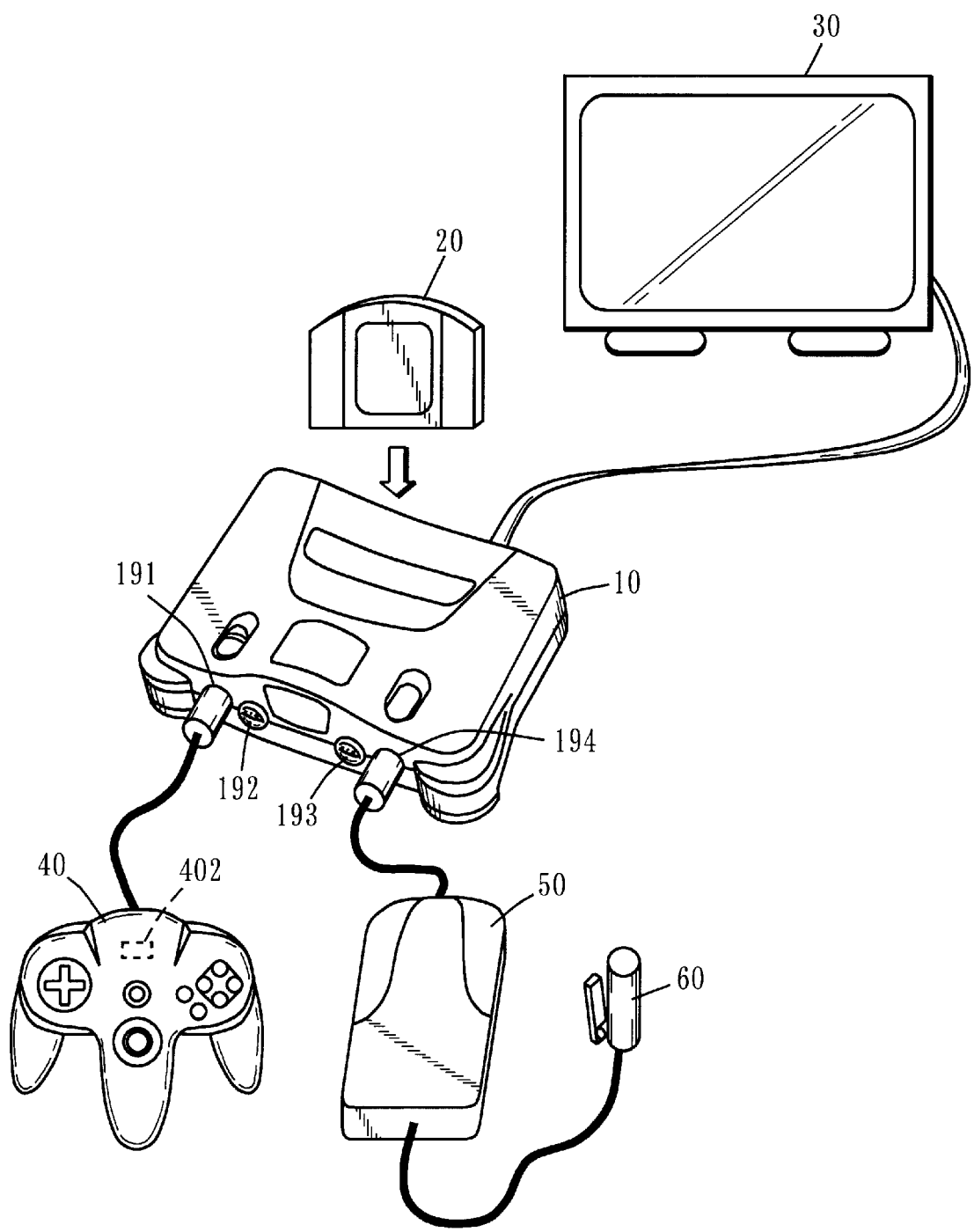

IMAGE PROCESSING DEVICE USING SPEECH RECOGNITION TO CONTROL A DISPLAYED OBJECT

BACKGROUND OF THE INVENTION

1. Field of the Invention

The present invention relates to image processing devices, and more particularly to an image processing device which changes the state of display of a dialogue partner object in response to speech input from a user.

2. Description of the Background Art

Speech recognition devices that recognize spoken words by a user's speech have been utilized in various fields. For example, known applications of such speech recognition devices include image processing devices (e.g., video game machines) which change the content of images (e.g., characters) displayed on the screen in response to speech commands (refer to Japanese Patent Laying-Open No. 9-230890, for example).

However, conventional image processing devices utilizing speech recognition are constructed to change images only when particular words are spoken, so that the operator must previously know the words that can be used as input to the device. If the operator does not know the predefined input words, the operator can only guess what the appropriate words may be, thereby making the image processing device very inconvenient to use. Furthermore, conventional image processing devices utilizing speech recognition do not change the display when an improper or unrecognized word is entered, thereby causing the operator to be puzzled as to whether he/she input a wrong word or the machine is malfunctioning.

Moreover, conventional image processing devices utilizing speech recognition process the results of speech recognition in a fixed way independently of the progress of the program. However, depending on the type of program executed in the image processing device, it may be preferred that the method of processing the speech recognition results is changed as the program progresses. For example, if the program executed in the image processing device is a video game program, an effective way of making the game more amusing is to change the relation between the speech recognition results and actions of the characters as the player clears several stages and becomes more skillful at playing the game. Also, when the program executed in the image processing device is an educational program for teaching language to children, an effective way for successful learning is to change the method of processing the speech recognition results so as to require the children to more correctly pronounce words as their learning progresses.

SUMMARY OF THE INVENTION

Accordingly, an object of the present invention is to provide an image processing device which can be easily used even if the operator does not know usable words prior to using the device.

Another object of the invention is to provide an image processing device which can change the way the speech recognition results are processed as the program advances.

To achieve the objects above, the present invention has the following features.

A first aspect of the present invention is directed to an image processing device for varying action of a dialogue partner object displayed on a display device in response to speech input from a user through a microphone. According to the invention, the image processing device comprises:

a converting part for converting an analog speech signal received by the microphone to digital speech data;

a speech recognition part for recognizing a word corresponding to the digital speech data converted by the converting part;

a determining part for determining whether the word recognized by the speech recognition part matches a word to be inputted at that time;

a first display control part for, when the determining part determines a word match, controlling a displayed state of the dialogue partner object to cause the dialogue partner object to perform an action corresponding to the recognized word; and a second display control part for, when the determining part determines no word match, displaying on the display device an indication to the user that the determining part did not find a match for the word.

As stated above, according to the first aspect of the invention, a determination delivering display is provided that indicates a mismatch of words when a word different from predetermined words to be inputted are entered, thereby preventing the user from being puzzled or confused when an improper word is entered.

According to a second aspect of the invention, in the image processing device of the first aspect, the second display control part makes a display on the display device, as the determination delivering display, to show that the dialogue partner object cannot understand the input word.

As stated above, according to the second aspect, when a word different from predetermined words to be inputted are entered, a display is made to show that the dialogue partner object cannot understand the input word speech, so that the user can more clearly recognize that he/she has entered a wrong word.

According to a third aspect of the invention, in the image processing device of the second aspect, when the determining part continuously determines a mismatch of words over a given time period, the second display control part further displays on the display device, as the determination delivering display, a message containing a proper word to be inputted at that time.

As stated above, according to the third aspect, when a correct word is not entered over a given time period, a message that contains a correct word to be currently inputted is further displayed, which prevents the user from repeatedly entering wrong words.

According to a fourth aspect of the invention, in the image processing device of the second aspect, when the determining part repeatedly determines a mismatch of words over a given number of times, the second display control part further displays on the display device, as the determination delivering display, a message containing a proper word to be inputted at that time.

As stated above, according to the fourth aspect, when wrong words are repeatedly entered a given number of times, a message which contains a proper word to be inputted at that time is further displayed, which prevents the user from repeatedly entering wrong words.

According to a fifth aspect of the invention, in the image processing device of the third aspect, the second display control part controls the display on the display device so that the word to be inputted at that time and the remaining part of the message are displayed in different colors in the message.

According to a sixth aspect of the invention, in the image processing device of the fourth aspect, the second display control part controls the display on the display device so that the word to be inputted at that time and the remaining part of the message are displayed in different colors in the message.

As stated above, according to the fifth and sixth aspects, a word to be currently inputted is displayed in a color different from the remaining part of the message sentence, so that the user can easily recognize the word to be inputted.

According to a seventh aspect of the invention, an image processing device is provided for displaying a given image on a display device according to set program data and to vary action of a dialogue partner object displayed on the display device in response to a spoken word from a user through a microphone, wherein the device comprises:

a converting part for converting an analog speech signal input to the microphone to digital speech data;

a speech recognition part for recognizing a word corresponding to the digital speech data converted by the converting part;

a display control part for controlling a displayed state of the dialogue partner object on the basis of the result of recognition made by the speech recognition part; and a degree of progress detecting part for detecting a degree of progress of the program data;

wherein the display control part changes, in steps, the way the displayed state of the dialogue partner object is controlled in accordance with the degree of progress of the program data detected by the degree of progress detecting part.

As stated above, according to the seventh aspect, the displayed state of the dialogue partner object is controlled such that it is changed in steps in accordance with the degree of progress of the program data, which enables the dialogue to be controlled in a varied manner based on the progress of the game.

According to an eighth aspect of the invention, in the image processing device of the seventh aspect, the display control part comprises, a first display control part for causing the dialogue partner object to perform a predetermined action independently of the word recognized by the speech recognition part when the degree of progress of the program data detected by the degree of progress detecting part is at a relatively elementary level, and second display control part for causing the dialogue partner object to perform a corresponding action in accordance with the word recognized by the speech recognition part when the degree of progress of the program data detected by the degree of progress detecting part is at a relatively advanced level.

As stated above, according to the eighth aspect of the invention, when the degree of progress of the program data is at a relatively elementary level, the dialogue partner object is made to perform a given action independently of the type of the recognized word. On the other hand, when the degree of progress of the program data is at a relatively advanced level, the dialogue partner object is made to perform a corresponding action in accordance with the type of the recognized word. Thus, the recognized result can influence the display control of the dialogue partner object to varying degrees in accordance with the progress of the program data.

According to a ninth aspect of the invention, in the image processing device of the eighth aspect, the second display control part comprises, a determining part for determining whether the word recognized by the speech recognition part matches a word to be inputted at that time, and a corresponding action control part for, when the determining part determines a word match, causing the dialogue partner object to perform an action corresponding to the matched word.

As stated above, according to the ninth aspect of the invention, when a recognized word matches a word to be currently inputted, the dialogue partner object is made to perform an action corresponding to the matched word, so that the actions to be performed by the dialogue partner object can be arbitrarily defined by the program.

According to a tenth aspect of the invention, in the image processing device of the ninth aspect, the speech recognition part comprises;

a dictionary part in which word data is stored as a reference, a correlation distance calculating part for comparing the digital speech data with words in the dictionary part to calculate a correlation distance indicating degree of similarity for word in the dictionary, a ranking part for ranking the word data stored in the dictionary part in order of similarity, starting from the highest, on the basis of the correlation distances calculated by the correlation distance calculating part, and a candidate word data output part for outputting, as candidate word data, the word data having the highest rank among the words stored in the dictionary part to the determining part, wherein the determining part determines whether the candidate word data provided from the candidate word data output part matches a word to be inputted at that time, wherein the determining part starts with the candidate word data having the highest similarity, and stops the determination operation when a match is determined and gives a match determination output to the corresponding action control part.

As stated above, according to the tenth aspect of the invention, starting with the candidate word data having the highest similarity, the candidate word data supplied is checked to see whether it matches a word to be inputted at that time. The dialogue partner object is made to perform the corresponding action when a match is found. Accordingly it is possible to cause the dialogue partner object to perform desired action even when the speech recognition is not very accurate.

According to an eleventh aspect of the invention, in the image processing device of the tenth aspect, the determining part reduces the number of word data to be selected from the candidate word data and subjected to the match determination as the degree of progress of the program data detected by the degree of progress detecting part advances.

As stated above, according to the eleventh aspect of the invention, the number of pieces of word data to be selected from the candidate word data as subjects for match determination is reduced as the degree of progress of the program data advances. Thus, it is possible to provide stricter speech recognition so as to require more accurate speech input from the user as the program data progresses.

According to a twelfth aspect of the invention, in the image processing device of the ninth aspect, the speech recognition part comprises;

a dictionary part in which word data to be inputted at that time is stored, a correlation distance calculating part for comparing the digital speech data and each piece of the word data stored in the dictionary part to calculate a correlation distance showing the degree of similarity for each piece of word data, and a candidate word data output part for selecting word data having the highest similarity on the basis of the correlation distances calculated by the correlation distance calculating part and outputting the selected word data and its correlation distance as candidate word data to the determining part, and wherein the determining part detects whether a first similarity defined by the correlation distance contained in the candidate word data is higher than a second similarity defined by a preset threshold, and when the first similarity is higher than the second similarity, determines that the word recognized by the speech recognition part matches a word to be inputted at that time, and when the second similarity is higher than the first similarity, determines that the word recognized by the speech recognition part does not match a word to be inputted at that time.

According to a thirteenth aspect of the invention, in the image processing device of the seventh aspect, the program data is program data for a video game stored in a portable storage medium.

According to a fourteenth aspect of the invention, in a storage medium which contains program data executed in an image processing device for changing action of a dialogue partner object displayed on a display device in response to speech commands inputted from a user through a microphone, when executing the program data, the image processing device converts an analog speech signal inputted by the microphone to digital speech data, recognizes a word corresponding to the converted digital speech data, and determines whether the recognized word matches a particular word to be inputted at that time, and when word match is determined, the image processing device controls the displayed state of the dialogue partner object to cause the dialogue partner object to perform an action corresponding to the recognized word, and when no word match is determined, the image processing device makes a determination delivering display on the display device to show the result of this determination to the user.

According to a fifteenth aspect of the invention, in a storage medium which contains program data executed in an image processing device for changing action of a dialogue partner object displayed on a display device in response to speech commands inputted from a user through a microphone, when executing the program data, the image processing device converts an analog speech signal inputted by the microphone to digital speech data, recognizes a word corresponding to the converted digital speech data, and controls a displayed state of the dialogue partner object on the basis of the recognized word, and wherein the displayed state of the dialogue partner object is controlled such that it is changed in steps in accordance with the degree of progress of the program data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing the structure of a video game system according to one embodiment of the instant invention.

DESCRIPTION OF THE PREFERRED EMBODIMENTS

Figure 2:
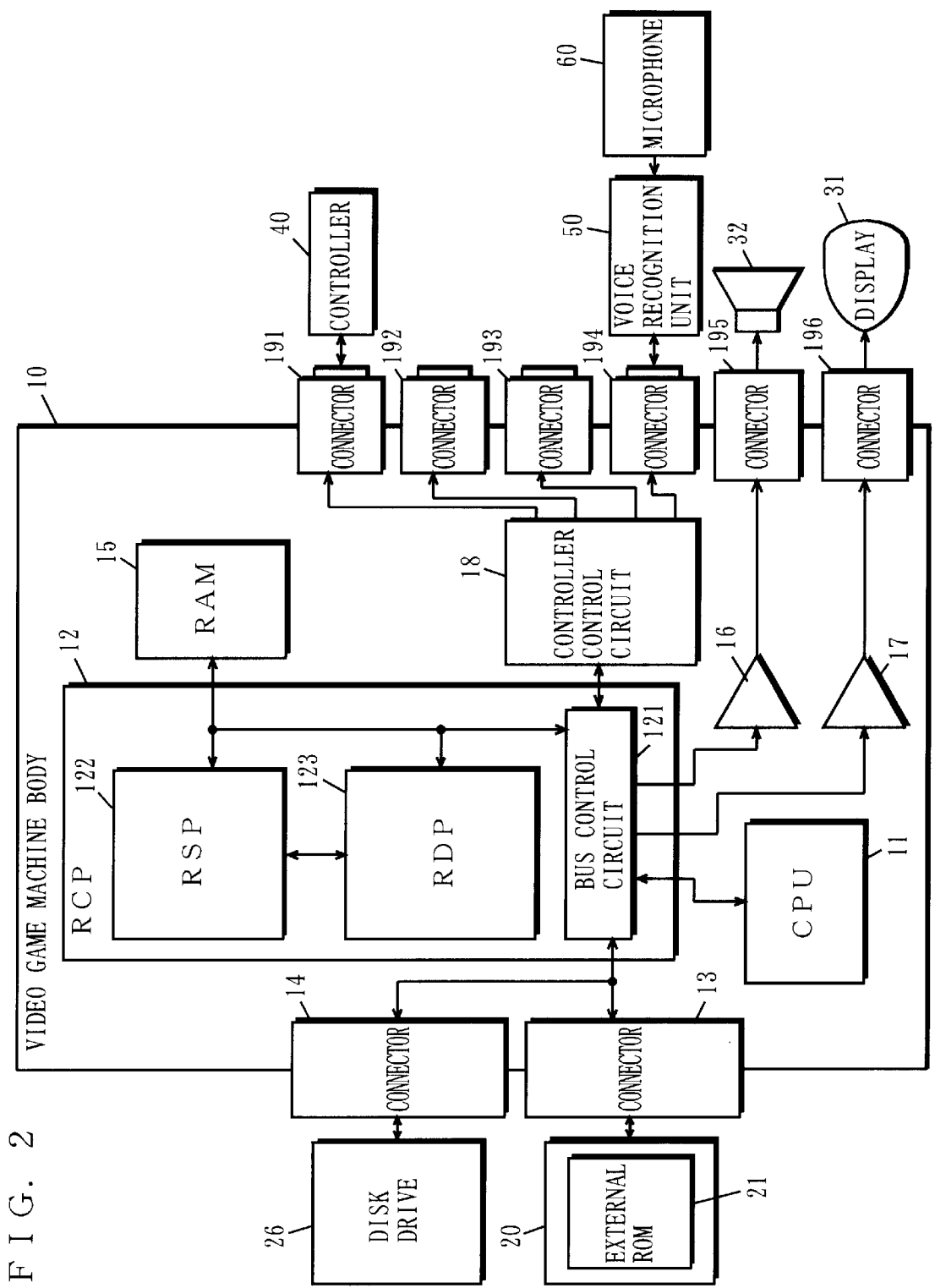
FIG. 2 is a block diagram showing the overall configuration of the video game system shown in FIG. 1.

FIG. 1 shows the structure of a video game system according to one embodiment of the present invention. In FIG. 1, the video game system of this embodiment includes a video game machine body 10, a ROM cartridge 20, a television receiver 30 connected to the video game machine body 10, a controller 40, a speech recognition unit 50, and a microphone 60.

The ROM cartridge 20 includes an external ROM fixedly storing data for a game, such as the game program, character data, for example, which can be attached to/removed from the video game machine body 10. The controller 40 includes a housing shaped so that it can be held with both hands or a hand and a plurality of switches formed on the housing. The functions of the switches can be arbitrarily defined depending on the game program. The controller 40 has a Z button 40Z provided on the back of the housing, which is used in this embodiment. The speech recognition unit 50 recognizes spoken words picked up through the microphone 60.

FIG. 2 is a block diagram showing the overall configuration of the video game system shown in FIG. 1. In FIG. 2, the video game machine body 10 contains a central processing unit (hereinafter referred to as CPU) 11 and a reality coprocessor (hereinafter referred to as RCP) 12. The RCP 12 includes a bus control circuit 121 for controlling buses, an image processing unit (a reality signal processor; hereinafter referred to as RSP) 122 for performing polygon coordinate transformation, shading, for example, and an image processing unit (reality display processor; hereinafter referred to as RDP) 123 for rastering polygon data for an image to be displayed and also converting the polygon data into a data format (dot data) that can be stored in a frame memory. Connected to the RCP 12 is a cartridge connector 13 to which the ROM cartridge 20 is detachably connected, a disk drive connector 14 to which a disk drive 26 is detachably connected, and a RAM 15. Also connected to the RCP 12 are a sound signal generating circuit 16 for outputting a sound signal processed in the CPU 11 and a video signal generating circuit 17 for outputting a video signal processed in the CPU 11. A controller control circuit 18 for serially transferring operating data about one or more controllers and/or data from the speech recognition unit 50 is also connected to the RCP 12.

The bus control circuit 121 contained in the RCP 12 converts parallel-to-serial commands given in the form of a parallel signal from the CPU 11 through the bus and supplies the serial signal to the controller control circuit 18. The bus control circuit 121 also converts a serial signal coming from the controller control circuit 18 to a parallel signal and gives it to the CPU 11 through the bus. Data indicating the operating state read from the controller 40 is processed in the CPU 11 or temporarily stored in the RAM 15. In other words, the RAM 15 contains a storage area for temporarily storing data processed in the CPU 11, which is used to smoothly read or write data through the bus control circuit 121.

A connector 195 provided on the rear side of the video game machine body 10 is connected to the output of the sound signal generating circuit 16. A connector 196 provided on the rear side of the video game machine body 10 is connected to the output of the video signal generating circuit 17. A speaker 32 contained in the television receiver 30 is detachably connected to the connector 195. A display 31 like a CRT contained in the television receiver 30 is detachably connected to the connector 196.

Controller connectors (hereinafter referred to as connectors) 191 to 194 provided on the front side of the video game machine body 10 are connected to the controller control circuit 18. The controller 40 can be detachably connected to the connectors 191 to 194 through a connection jack. The speech recognition unit 50 can be detachably connected to the connectors 191 to 194, as well. In FIG. 2, the speech recognition unit 50 is connected to the connector 194 and the controller 40 is connected to the connector 191, for example. In this way, the controller 40 and/or the speech recognition unit 50 can be connected to the connectors 191 to 194 and thus the controller 40 and/or the speech recognition unit 50 can be electrically connected to the video game machine body 10 so that they can transmit/receive or transfer data with each other.

Figure 3:
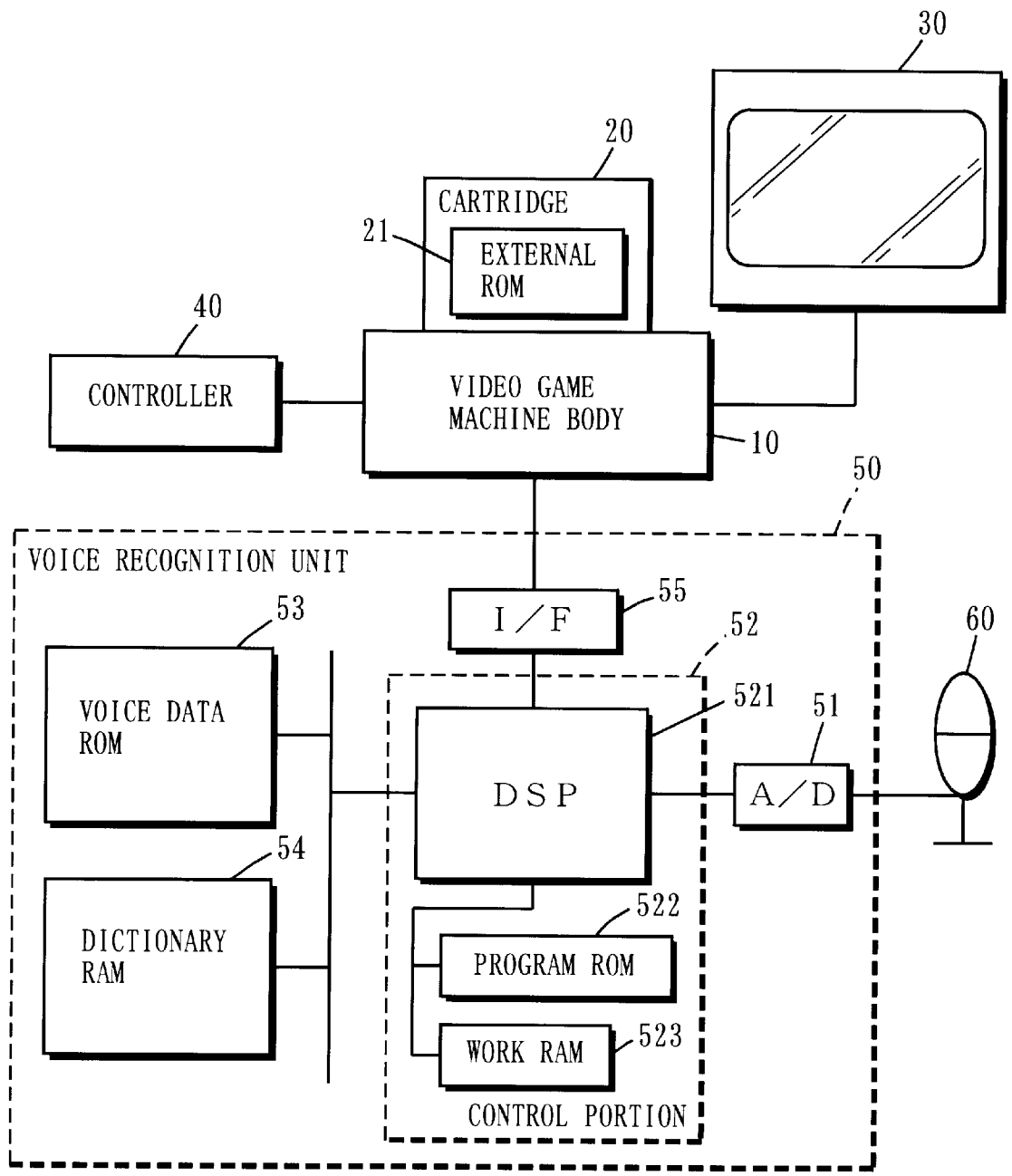
FIG. 3 is a block diagram more fully showing the structure of a speech recognition unit 50 shown in FIG. 1.

FIG. 3 is a block diagram showing the structure of the speech recognition unit 50 in greater detail. In FIG. 3, the speech recognition unit 50 includes an A/D converter 51, a controlling portion 52, a speech data ROM 53, a dictionary RAM 54, and an interface 55. The control portion 52 includes a DSP (digital signal processor) 521, a program ROM 522, and a work RAM 523.

The A/D converter 51 converts an analog speech signal picked up by the microphone 60 to digital speech data. The digital speech data outputted from the A/D converter 51 is sent to the DSP 521. The DSP 521 operates in accordance with an operational program stored in the program ROM 522. The work RAM 523 is used to store data that the DSP 521 requires in data processing. The speech data ROM 53 contains speech data about basic sounds (that is, vowels and consonants) as fundamentals of speech synthesis. The dictionary RAM 54 stores data about a plurality of words used in the game (in other words, words expected as inputs from the microphone 60) in the form of code data. When speech data is entered from the microphone 60, the DSP 521 selects and reads data about one word from the dictionary RAM 54, reads the corresponding basic sound data from a plurality of pieces of basic sound data stored in the speech data ROM 53, and synthesizes the data to produce speech data formed as a word. The DSP 521 then compares the synthesized speech word data and the speech data of the word entered from the microphone 60 and calculates the correlation distance representing the degree of their similarity. It is assumed herein that the mutual similarity is higher as the correlation distance is smaller. The DSP 521 computes the similarity or correlation distance for all words stored in the dictionary RAM 54. After that, the DSP 521 sends the calculated correlation distances and the corresponding word code numbers of words having higher similarities with the input word to the video game machine body 10 through the interface 55.

The ROM cartridge 20 has an external ROM 21 mounted on a substrate and accommodated in the housing. The external ROM 21 stores image data and program data for image processing in a game, for example, and also contains sound data such as music, sound effects, messages, for example, as desired.

Figure 4:
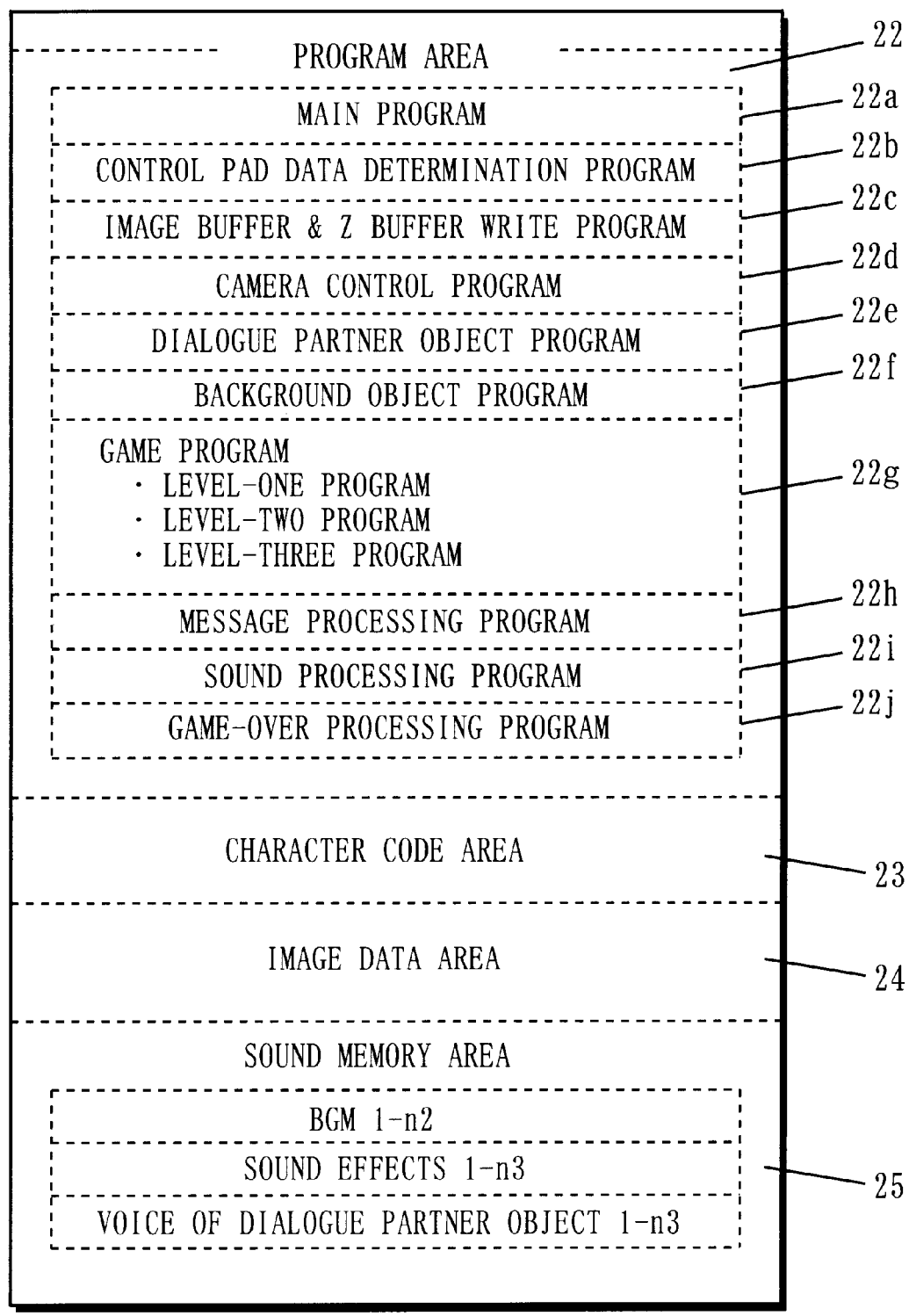
FIG. 4 is a memory map schematically showing the memory space in an external ROM 21 shown in FIG. 2.
Figure 5:
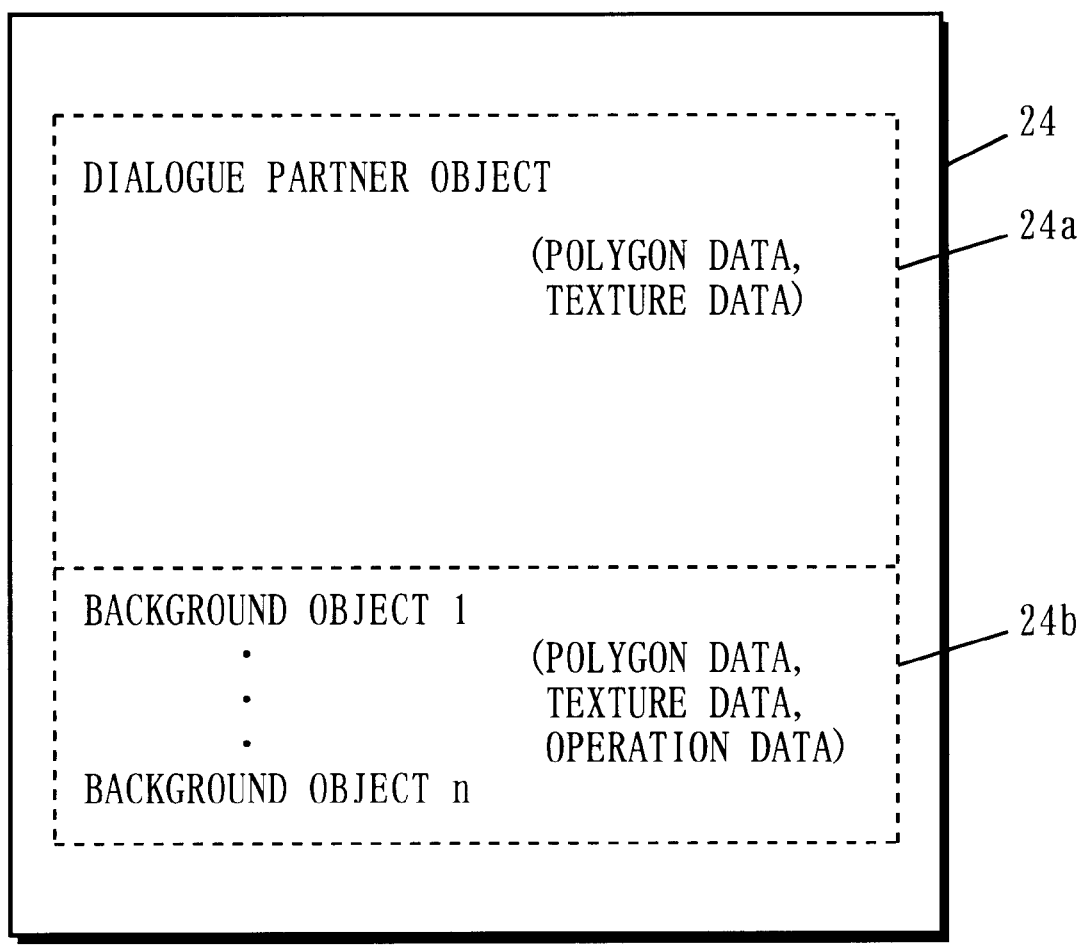
FIG. 5 is a memory map showing details of part of the memory space in the external ROM 21 (an image display data area 24).

FIG. 4 is a memory map schematically showing the memory space in the external ROM 21. FIG. 5 is a memory map showing part of the memory space (an image data area 24) in the external ROM 21 in detail. As shown in FIG. 4, the external ROM 21 includes as storage areas: a program area 22, a character code area 23, an image data area 24, and a sound memory area 25, in which various programs are fixedly stored in advance.

The program area 22 contains programs necessary to perform image processing in the game, for example, game data corresponding to the contents of the game, and so forth. More specifically, the program area 22 includes storage areas 22a to 22j for fixedly storing operational programs for the CPU 11 (programs for performing operations corresponding to the flowcharts shown in FIGS. 7, 8, 10 to 18 that will be described later).

The main program area 22a contains a processing program for the main routine in the game, for example, shown in FIG. 7, which will be described later. The control pad data (operating state) determining program area 22b contains a program for processing data representing the operating state, for example, of the controller 40. The write program area 22c contains a write program executed when the CPU 11 writes data into a frame memory and a Z buffer through the RCP 12. For example, the write program area 22c contains a program for writing color data into the frame memory area (a storage area 152 shown in FIG. 6) in the RAM 15 as image data based on texture data of a plurality of moving objects or background objects to be displayed in one background screen, and also contains a program for writing depth data into the Z buffer area (a storage area 153 shown in FIG. 6). The camera control program area 22d contains a camera control program for controlling the position and direction for shooting the moving objects and background objects in a three-dimensional space. The dialogue partner object program area 22e contains a program for controlling display of an object, a kind of moving object, as a partner in dialogue with which the player communicates through speech input (hereinafter referred to as dialogue partner object). The background object program area 22f contains a background producing program through which the CPU 11 causes the RCP 12 to produce three-dimensional background images (still image, course image, for example). The game program area contains programs for game processing (see FIG. 8). The programs for game processing include a level-one game program (see FIG. 12), a level-two game program (see FIG. 13), and a level-three game program (see FIG. 16). In this embodiment, the game program executed varies as level one, level two, level three as the game progresses. The message processing program area 22h contains a program for displaying given messages to the player so that the player can enter given speech commands (see FIG. 14). The sound processing program area 22i contains a program for generating messages in sound effects, music, or speech. The game-over processing program area 22j contains a program executed when the game is over (for example, detecting the game over state and saving backup data of the present game conditions when the game is over).

The character code area 23 is an area for storing character codes of a plurality of kinds, which contains dot data about a plurality of kinds of characters corresponding to the codes, for example. The character code data stored in the character code area 23 is used to display explanatory sentences to the player in the progress of the game. For example, the data is used to timely display an appropriate operating method through a message (or lines) with characters in accordance with the environment in which the dialogue partner object is placed (place, types of obstacles, types of enemy objects, for example) and the conditions of the dialogue partner object.

The image data area 24 includes storage areas 24a and 24b as shown in FIG. 5. The image data area 24 contains image data, such as coordinate data of a plurality of polygons, texture data, for example, for each background object and/or moving object, and it also contains a display control program for displaying the objects fixedly in a given position or in motion. For example, the storage area 24a is used to store a program for displaying the dialogue partner object. The storage area 24b is used to store a background object program for displaying a plurality of background (or still) objects 1 to n.

The sound memory area 25 contains, sound data about words for outputting speech messages appropriate to the individual scenes, speech of the dialogue partner object, sound effects, game music, for example.

For the external storage device connected to the video game machine body 10, various storage media, such as a CD-ROM, a magnetic disk, for example, can be used in place of the ROM cartridge 20 or in addition to the ROM cartridge 20. In this case, the disk drive (a recording/reproducing device) 26 is used to read, or to write when needed, various data about the game (including program data and image display data) to and from the optical or magnetic disk-like storage medium, such as the CD-ROM or magnetic disk. The disk drive 26 reads the magnetically or optically stored program data, like that stored in the external ROM 21, from the magnetic disk or optical disk and transfers the data to the RAM 15.

Figure 6:
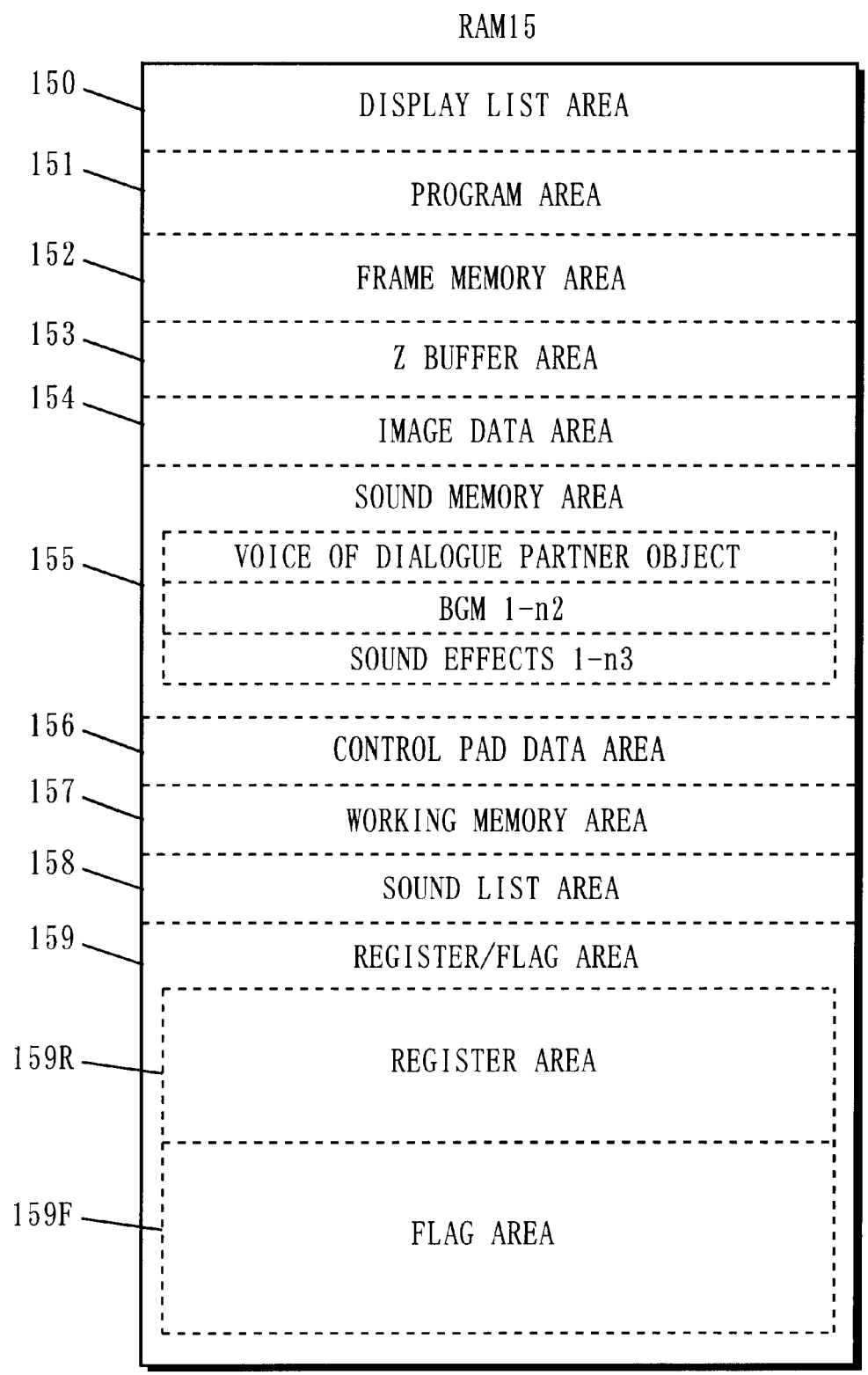
FIG. 6 is a memory map schematically showing the memory space in a RAM 15 shown in FIG. 2.

FIG. 6 shows a memory map schematically showing the memory space in the RAM 15. The RAM 15 includes as the storage areas: a display list area 150, a program area 151, a frame memory (or an image buffer memory) area 152 for temporarily storing image data for one frame, a Z buffer area 153 for storing depth data for each dot in the image data stored in the frame memory area, an image data area 154, a sound memory area 155, a control pad data area 156 for storing data indicative of the operating state of the control pad, a working memory area 157, a sound list area 158, and a register/flag area 159, for example.

The storage areas 150 to 159 are memory spaces to which the CPU 11 can access through the bus control circuit 121 or memory spaces to which the RCP 12 can directly access, to which arbitrary capacities (or memory spaces) are allocated depending on the game used. The program area 151, image data area 154, and sound memory area 155 are used to temporarily store corresponding data when part of the game program data for all stages (or scenes or fields) in one game stored in the storage areas 22, 24, 25 in the external ROM 21 is transferred (for example, in the case of an action or role playing game, game program data for one stage or field (or one course in a racing game)). As compared with an operation in which the CPU 11 has to read currently required data directly from the external ROM 21 every time required, the CPU 11 can process data more efficiently when part of various program data required for one scene is thus stored in the storage areas 151, 154, 155, which speeds up the image processing.

Specifically, the frame memory area 152 has a storage capacity corresponding to (the number of picture elements (pixels or dots) in the display 31)*(the number of bits of color data for one picture element), which stores color data for individual dots in correspondence with the picture elements in the display 31. For the game processing mode, the frame memory area 152 temporarily stores color data for individual dots of objects that can be seen from the point of sight, on the basis of three-dimensional coordinate data for displaying, with sets of polygons, one or more still objects and/or moving objects to be displayed in one background screen stored in the image data area 154. For the display mode, the frame memory area 152 temporarily stores color data for individual dots when displaying various objects such as moving objects like the dialogue partner object, companion objects, enemy objects, boss objects, and background (or still) objects stored in the image data area 154.

The Z buffer area 153 has a storage capacity corresponding to (the number of picture elements (pixels or dots) in the display 31)*(the number of bits of depth data for one picture element), which is used to store depth data for individual dots in correspondence with the picture elements in the display 31. For the image processing mode, the Z buffer area 153 temporarily stores depth data for individual dots of objects that can be seen from the point of sight, on the basis of the three-dimensional coordinate data for displaying one or more still objects and/or moving objects with sets of polygons, and for the display mode, it temporarily stores depth data for individual dots of the moving and/or still objects.

The image data area 154 stores coordinate data of sets of polygons and texture data for individual still and/or moving objects stored for display in the game in the external ROM 21. Data for at least one stage or field is transferred to the image data area 154 from the external ROM 21 prior to the image processing.

The sound memory area 155 receives part of the sound data (data about words, music, sound effects) transferred from the storage area in the external ROM 21. The sound memory area 155 temporarily stores the data transferred from the external ROM 21 as sound data to be generated from the speaker 32 (speech of the dialogue partner object, background music (BGM), sound effects, for example). The sound list area 158 is used to store sound data for producing the sounds to be generated from the speaker 32.

The control pad data (operating state data) storage area 156 temporarily stores operating state data indicating the operating state read from the controller 40. The working memory area 157 temporarily stores data like parameters while the CPU 11 is executing programs.

The register/flag area 159 includes a data register area 159R for storing various parameters and data and a flag area 159F for storing various flags.

Before describing the detailed operation of this embodiment, the outline of the game supposed in this embodiment will be described. In this game, a dialogue partner object clears various events prepared and beats enemies to clear stages while moving over various stages or fields in a three-dimensional space. The player operates the controller 40 to proceed with the game. In the course of the game, the player enters spoken words from a predetermined vocabulary through the microphone 60 to cause the dialogue partner object to perform given actions. The dialogue partner object is a kind of moving object, for which the main character in the game is usually selected.

Specifically, when given words are entered in speech, the dialogue partner object can be made to bow, change the walking direction, fish, or play a game of smashing a watermelon blindfolded, for example. In this game, some quizzes are prepared, where the speech input is utilized to enter answers to the quizzes.

Figure 7:
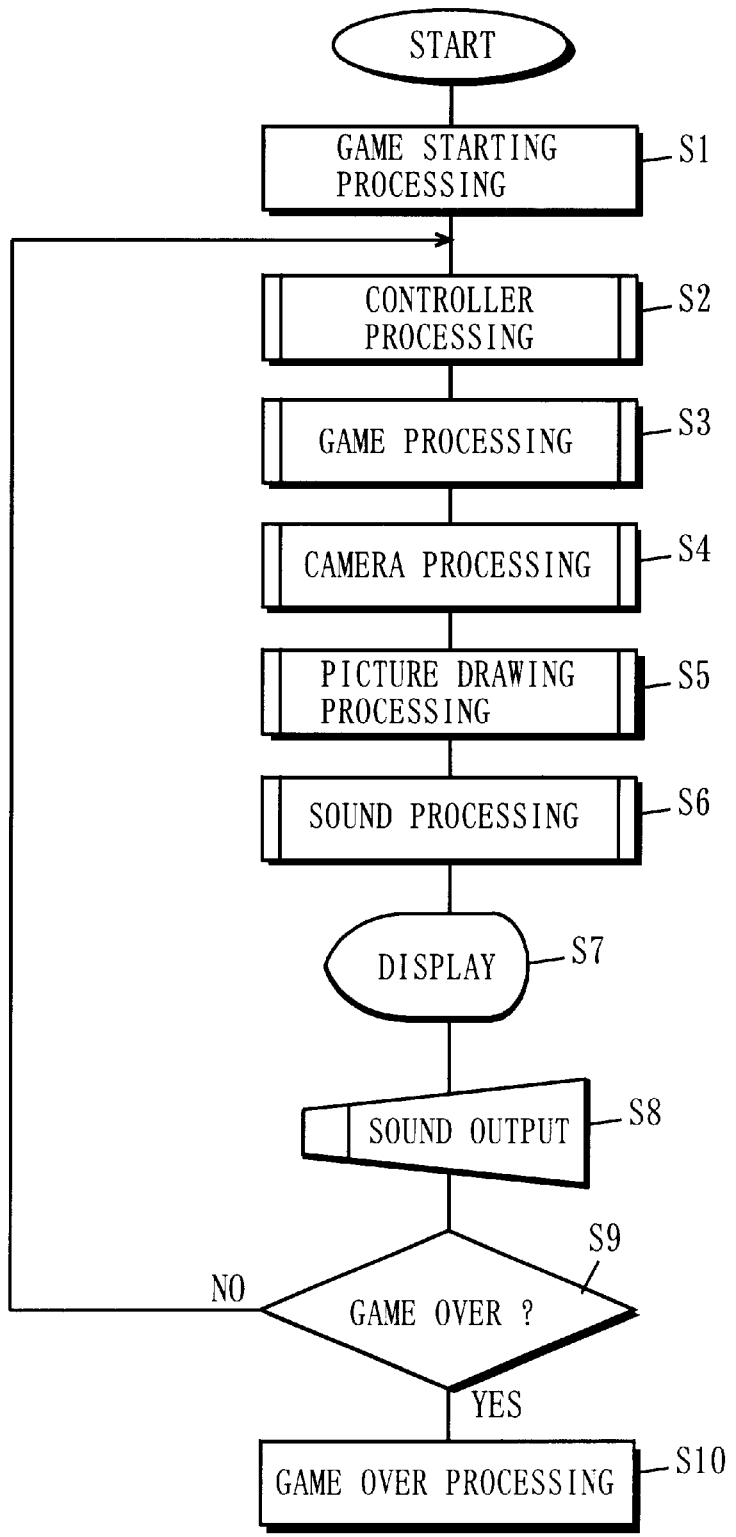
FIG. 7 is a flowchart of the main routine showing the entire operation of a game machine body 10 shown in FIG. 1.

FIG. 7 is a flowchart of the main routine showing the entire operation of the game machine body 10 shown in FIG. 2. The operation of this embodiment will now be described referring to the main routine flowchart shown in FIG. 7.

When the power-supply is turned on, the video game machine body 10 is initialized in a given manner at the beginning. In response, the CPU 11 transfers a starting program among the game programs stored in the program area in the external ROM 21 to the program area 151 in the RAM 15 to set various parameters to their initial values, and then executes the process shown in the main routine flowchart shown in FIG. 7.

The main routine process shown in FIG. 7 is executed by the CPU 11 for each frame (1/60 sec). That is to say, the CPU 11 performs the operations in steps S1 to S9 and then repeatedly performs the operations in steps S2 to S9 until one stage (or one field or course) is cleared. Note that steps S5 and S6 are processed in the RCP 12. When the game is over without successfully clearing the stage, the CPU 11 performs a game over processing function in step S10. When the stage is successfully cleared, it returns from step S10 to step S1.

Specifically, initialization (or the process of starting the game) is performed in step S1 to start the game. In this process, if the game can start at any position in a plurality of stages or courses, an image for selecting the stage or course is displayed. However, performed immediately after the game is started is the game starting processing for the first stage, since the game in the first stage is performed at the beginning. That is to say, the register area 159R and the flag area 159F are cleared, and various data required to perform the game in the first stage (which can be a stage or a course selected) is read from the external ROM 21 and transferred to the storage areas 151 to 155 in the RAM 15.

Next, controller processing is carried out in step S2. In this processing, it is detected whether any switch or button on the controller 40 has been operated, and the detected data indicating the operating state (controller data) is read and the read controller data is written.

Next, a game processing is carried out in step S3. In this processing, the progress of the game is controlled on the basis of the operating state of the controller 40 operated by the player and the speech entered from the microphone 60. The game processing will be fully described later referring to FIG. 8.

Next, a camera processing is carried out in step S4. In the camera processing, for example, coordinate values of objects seen at a specified angle are calculated so that the line of sight or field of view seen through the finder of the camera corresponds to an angle specified by the player.

Next, in step S5, the RCP 12 performs picture drawing processing. That is to say, under control by the CPU 11, the RCP 12 transforms the image data for the process of displaying the moving objects and still objects, on the basis of the texture data of enemies, player, and backgrounds stored in the image data area 154 in the RAM 15 (a processing of transforming coordinates and a processing of picture-drawing to the frame memory). Specifically, color data is written to paste colors specified by the texture data determined for each object, at addresses in the storage area 154 corresponding to respective triangular planes formed of a plurality of polygons for each of the plurality of moving objects and still objects. The picture drawing process will be described in greater detail later referring to FIG. 17.

Next, in step S6, sound processing is performed on the basis of sound data, such as messages, music, sound effects, for example. The sound processing will be described in detail later referring to FIG. 18.

Next, in step S7, the RCP 12 reads the image data stored in the frame memory area 152 on the basis of the results of the picture drawing processing in step S5 to display the dialogue partner object, still objects, enemy objects, for example, on the screen 31.

Next, in step S8, the RCP 12 reads the sound data obtained in the sound processing in step S6 to output sounds like music, sound effects, conversations, for example, from the speaker 32.

Next, in step S9, it is determined whether the stage or field has been cleared (clear detection). If it has not been cleared, it is determined in step S9 whether the game has been over; if the game is not over, the flow returns to step S2 and the operations in steps S2 to S9 are repeated until a game over condition is detected. When it is detected that a given game over condition has been satisfied (for example, when the number of mistakes allowed to the player has reached a given number, or when a given number of lives of the dialogue partner object have been used up), a given game over processing is carried out in the next step S10 (to select whether to continue the game, to select whether to store backup data, for example).

When a stage clear condition (the boss has been beaten, for example) is detected in step S9, a given clearing processing is carried out in step S10 and the flow returns to step S1.

Figure 9:
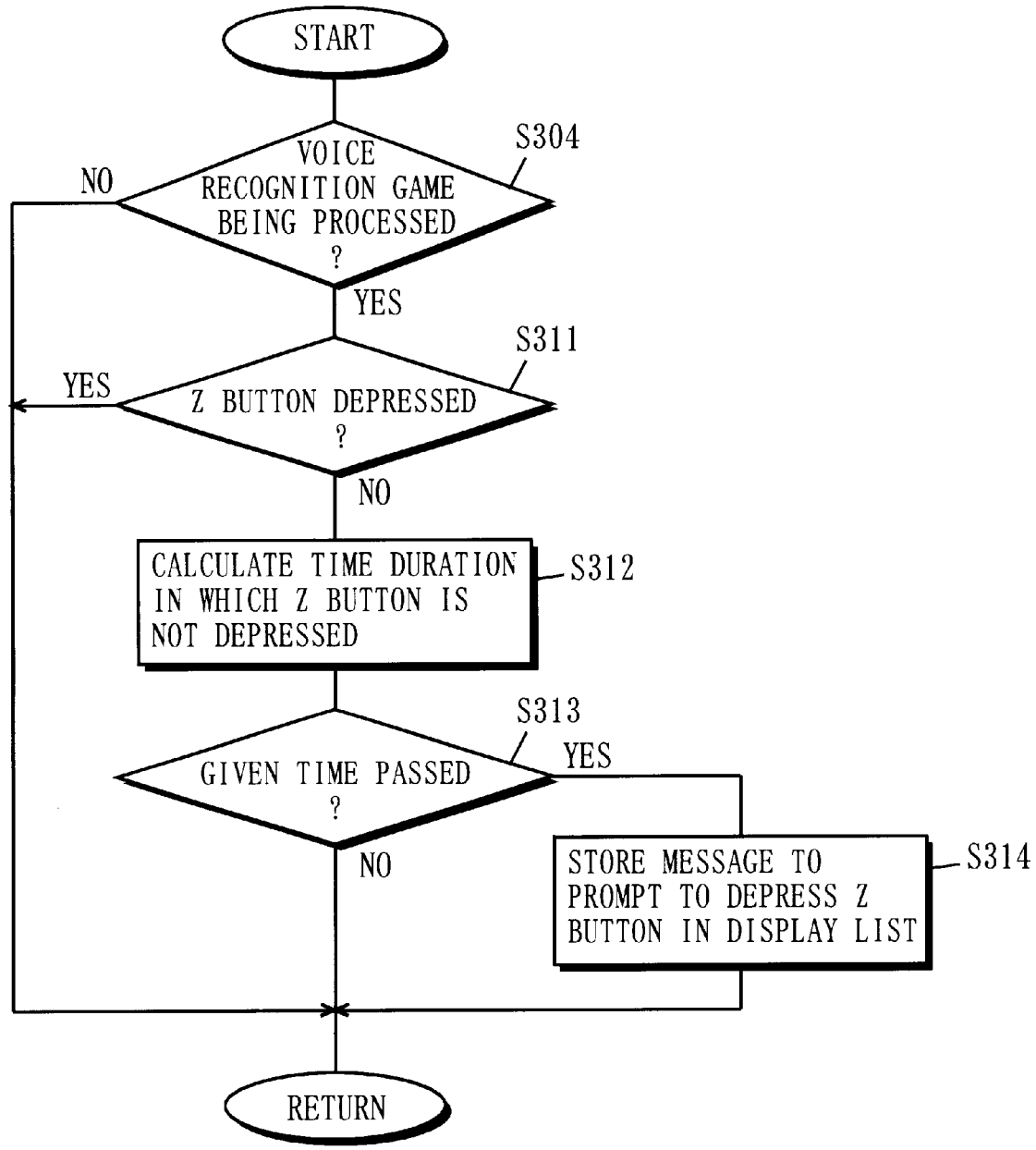
FIG. 9 is a subroutine flowchart showing detailed operation of the Z button processing (step S303) shown in FIG. 8.
Figure 10:
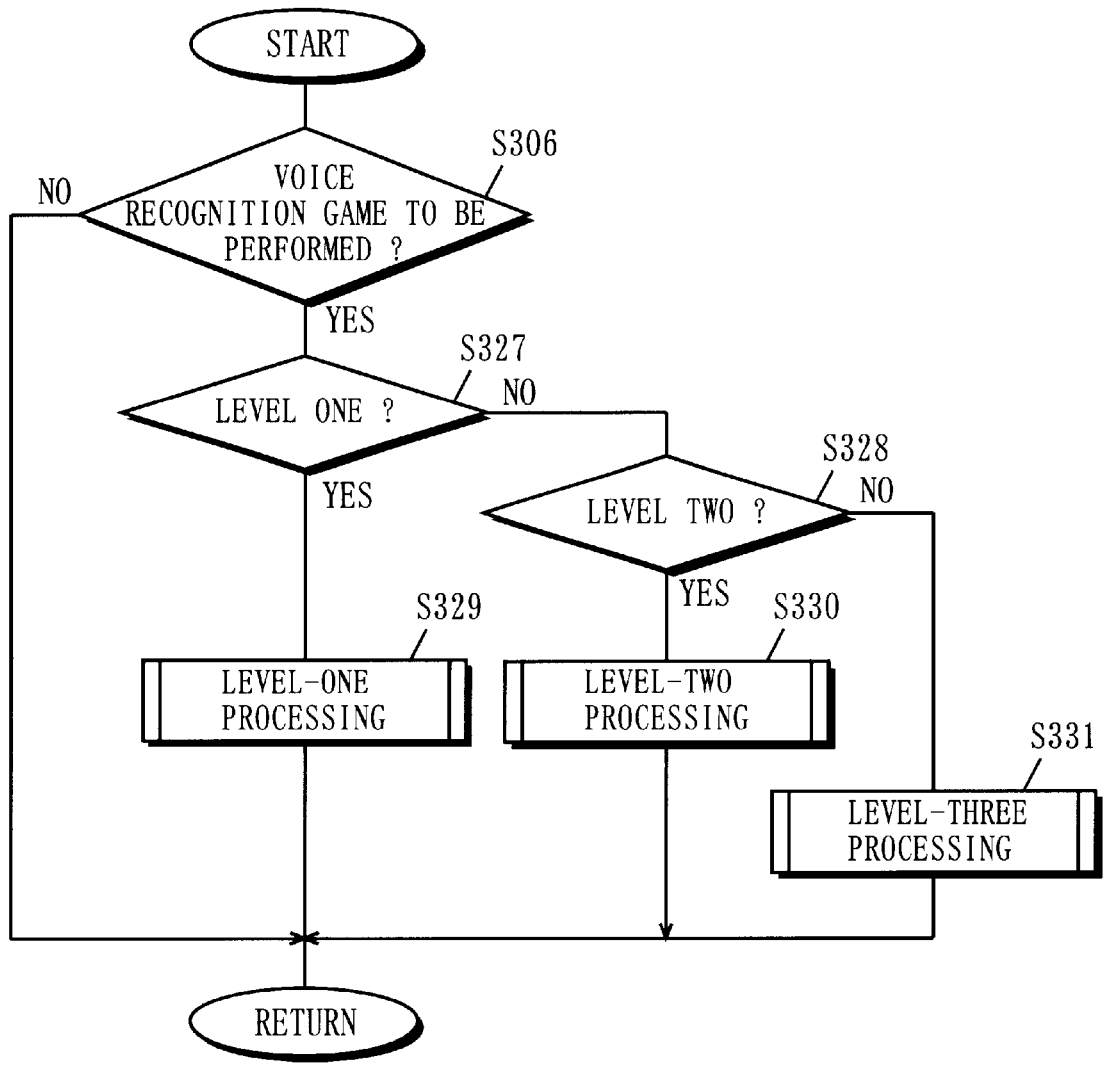
FIG. 10 is a subroutine flowchart showing detailed operation of the speech recognition game processing (step S305) shown in FIG. 8.
Figure 11:
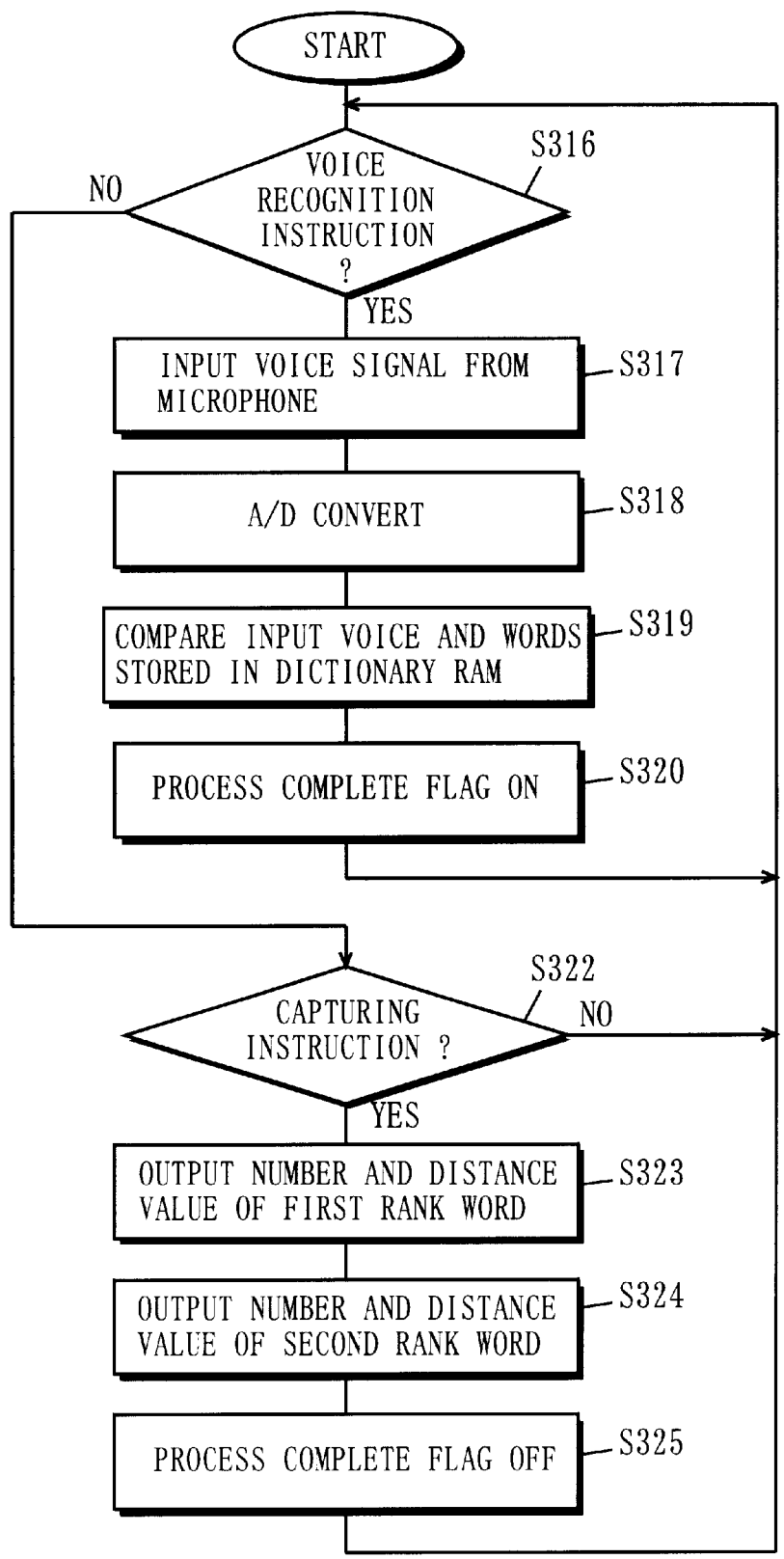
FIG. 11 is a flowchart showing detailed operation of the speech recognition processing performed in the speech recognition unit 50 shown in FIG. 1.

FIGS. 8 to 10 and 12 to 18 are flowcharts showing the details of the subroutines in the flowchart of FIG. 7. FIG. 11 is a flowchart showing the speech recognition processing in the speech recognition unit 50. FIGS. 19 to 25 are diagrams showing examples of images displayed on the display 31 during the game processing. Detailed operations in the subroutines will now be described referring to FIGS. 8 to 25.

First, referring to FIG. 8, the details of the game processing (step S3 in FIG. 7) will be described. The CPU 11 first determines whether it is time to perform speech recognition (step S301). This determination is "YES" when the CPU 11 is performing the speech recognition game processing described later and the Z button 40Z is being depressed. The game supposed to be processed in the video game machine of this embodiment has a speech recognition game mode and another game mode as game modes. In the speech recognition game mode, the game progresses in response to operation on the controller 40 and speech of the player entered from the microphone 60. In the other game mode, the game progresses simply in response to the operation on the controller 40. First, the other game mode is activated and therefore the determination of "NO" is made in step S301 in the initial state.

Next, the CPU 11 determines whether the speech recognition process in the speech recognition unit 50 has been completed (step S302). At this time, a determination of "NO" is made since the CPU 11 has not directed the speech recognition unit 50 to execute the speech recognition process. Next, the CPU 11 performs a Z button processing (step S303). The Z button processing is shown in detail in FIG. 9. Referring to FIG. 9, the CPU 11 determines whether the speech recognition game processing is in execution (step S304). As stated above, the other (no speech recognition) game processing mode is activated first, so that a determination of "NO" is made in step S304. Next, the operation of the CPU 11 enters the speech recognition game processing routine (step S305). The speech recognition game processing routine is shown in detail in FIG. 10. Referring to FIG. 10, the CPU 11 first determines whether to execute the speech recognition game (step S306). At this time, a determination of "NO" is made in step S306 since the other game processing mode is being activated.

Next, the CPU 11 executes the other game processing (step S307). Next, the CPU 11 determines whether one stage in the game has been cleared (step S308). In the video game of this embodiment, a level-up processing is performed every time one stage is cleared (step S309). This level-up processing is related to the speech recognition game processing described later. This embodiment has three levels, for example. When the level-up processing is completed, the CPU 11 executes a saving processing (step S310). In the saving processing, the CPU 11 stores various parameters for holding the current state of the game in a given storage portion (for example, in a save memory (not shown) in the ROM cartridge 20) in response to a saving request from the player.

Next, the operation performed when the game mode enters the speech recognition game mode as the game program processing progresses is described. In this case, first, in step S304 in FIG. 9, it is determined that the speech recognition game processing is in execution. While speech input from the player is then required, this embodiment is designed to exclude inputs other than the speech of the player as possible. That is to say, in this embodiment, the speech input is accepted only when the player is depressing the Z button 40Z. This can avoid, to a certain extent, entry of sounds other than speech uttered by the player when the Z button is not depressed (noise in life, for example). However, the player may often forget to depress the Z button 40Z to enter speech. Accordingly, the CPU 11 checks to see if the Z button 40Z is being depressed (step S311), and when the Z button 40Z is not being depressed, it measures the length of time in which it is not depressed (step S312). Then the CPU 11 determines whether the measured time has exceeded a given time period (step S313), and when it exceeds, the CPU 11 records display data for displaying a message to prompt the player to depress the Z button 40Z in the display list area 150 (FIG. 6) in the RAM 15 (step S314). The recorded display data is displayed on the display 31 in the picture drawing processing (step S5) described later.

Figure 8:
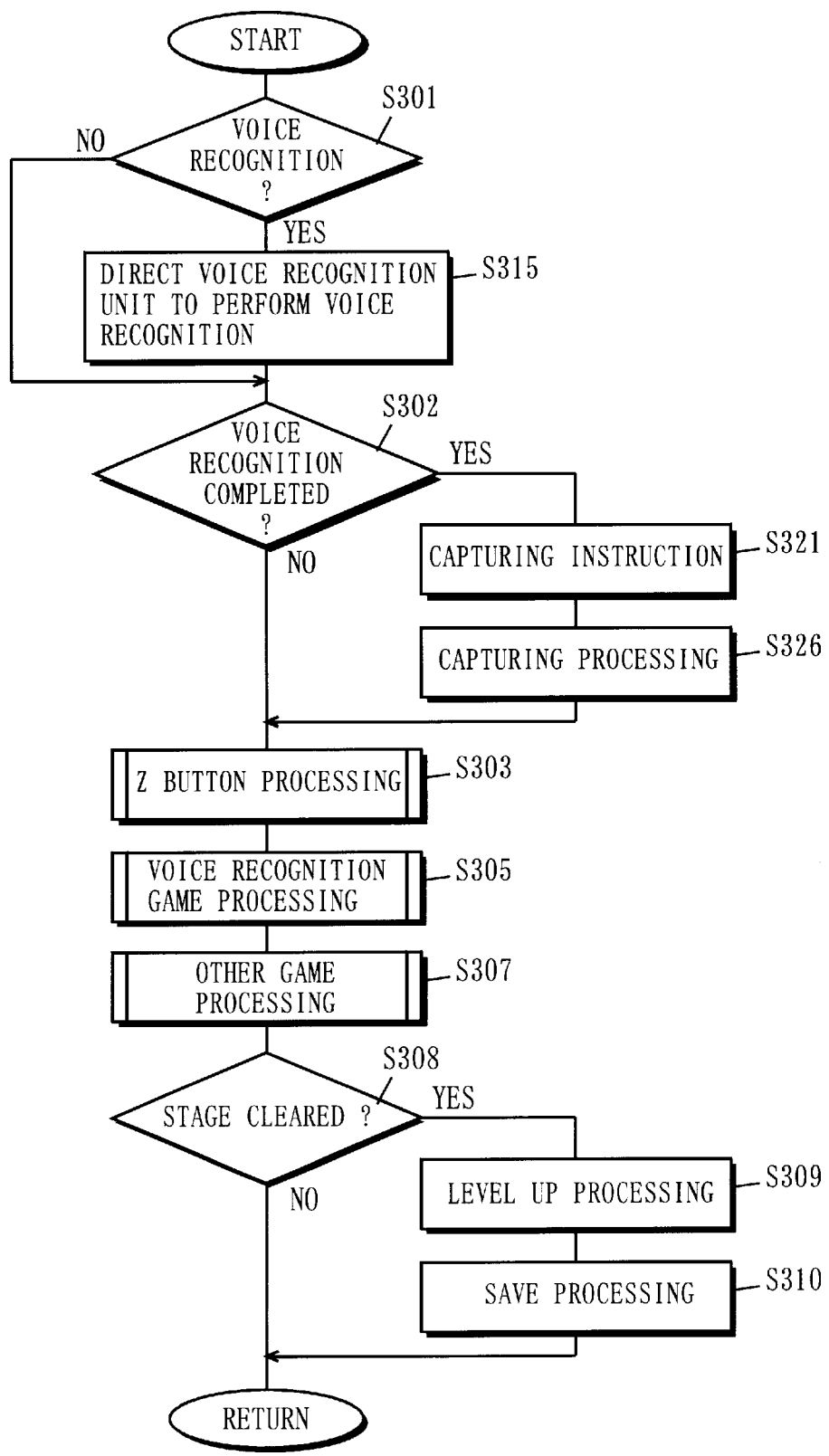
FIG. 8 is a subroutine flowchart showing detailed operation of the game processing (step S3) shown in FIG. 7.

When the player depresses the Z button 40Z spontaneously or as prompted by the message displayed in the display 31, the CPU 11 determines that the speech recognition game processing is being executed and that the Z button 40Z is being depressed in step S301 in FIG. 8, and directs the speech recognition unit 50 to execute the speech recognition processing (step S315). In response, the speech recognition unit 50 executes the speech recognition operation along the flowchart shown in FIG. 11. Referring to FIG. 11, the DSP 521 in the speech recognition unit 50 first determines that it has received the speech recognition instruction from the CPU 11 (step S316), and then receives a speech signal coming from the microphone 60 (step S317). Next, the DSP 521 causes the A/D converter 51 to convert the input analog speech signal to a digital speech signal (step S318). Next, the DSP 521 compares the input speech and words stored in the dictionary RAM 54 (step S320). In this process, as has been already explained, the DSP 521 selects and reads a piece of word data from the dictionary RAM 54, reads corresponding basic sound data from the plurality of pieces of basic sound data stored in the speech data ROM 53, synthesizes the basic sound data, and thus generates speech data in the form of a word. Then the DSP 521 compares the synthesized speech word data and the speech data of the word entered from the microphone 60 to calculate the correlation distance representing their similarity. It is assumed herein that the similarity becomes higher as the correlation distance is smaller. The DSP 521 performs the calculation of similarity or correlation distance for all words stored in the dictionary RAM 54. When the correlation distances have been calculated for all words, the DSP 521 turns on a processing completion flag (step S320). This processing completion flag is set in the flag area 159F in the RAM 15 (see FIG. 6), for example. Then the DSP 521 returns to the operation in step S316.

The CPU 11 determines that the speech recognition process in the speech recognition unit 50 has been completed when the process completion flag is turned on (step S302). Then the CPU 11 outputs a capturing instruction to the speech recognition unit 50 (step S321). In response, the DSP 521 in the speech recognition unit 50 determines that the capturing instruction has been outputted from the CPU 11 (step S322), and sends the code number and correlation distance value of the word ranked first (i.e. a word having the highest similarity to the speech-entered word among the words recorded in the dictionary RAM 54) to the video game machine body 10 through the interface 55 (step S323). The DSP 521 also sends the code number and correlation distance value of the word ranked second (i.e., a word having the second highest similarity to the speech entered word among the words recorded in the dictionary RAM 54) to the video game machine body 10 through the interface 55 (step S324). Next, the DSP 521 turns off the processing completion flag (step S325). The DSP 521 then returns to the operation in step S316.

The CPU 11 captures the code numbers and correlation distance values of the words sent in the steps S323 and S324 from the DSP 521 (step S326). Next, the operation of the CPU 11 enters the speech recognition game processing routine in step S305 via the Z button processing in step S303. In the step S305, the CPU 11 determines that the speech recognition game processing is in execution (step S306) and makes a determination as to whether the current game level is level one, level two, or level three (steps S327 and S328). When the determination shows that the current game level is level one, the CPU 11 executes the level-one game processing (step S329), and executes the level-two game processing when it is level two (step S330) and the level-three game processing when it is level three (step S331).

Next, referring to FIG. 12, the game processing for the level one will be described. In the level-one game processing, when a speech is entered from the microphone 60, the dialogue partner object is made to perform a given action independently of whether the input speech matches a word recorded in the dictionary RAM 54. That is to say, in the level-one game processing, the dialogue partner object is simply made to perform a given action determined in the program (to bow, jump, be delighted, for example) in accordance with presence/absence of a speech input, independently of the result of speech recognition.

Figure 12:
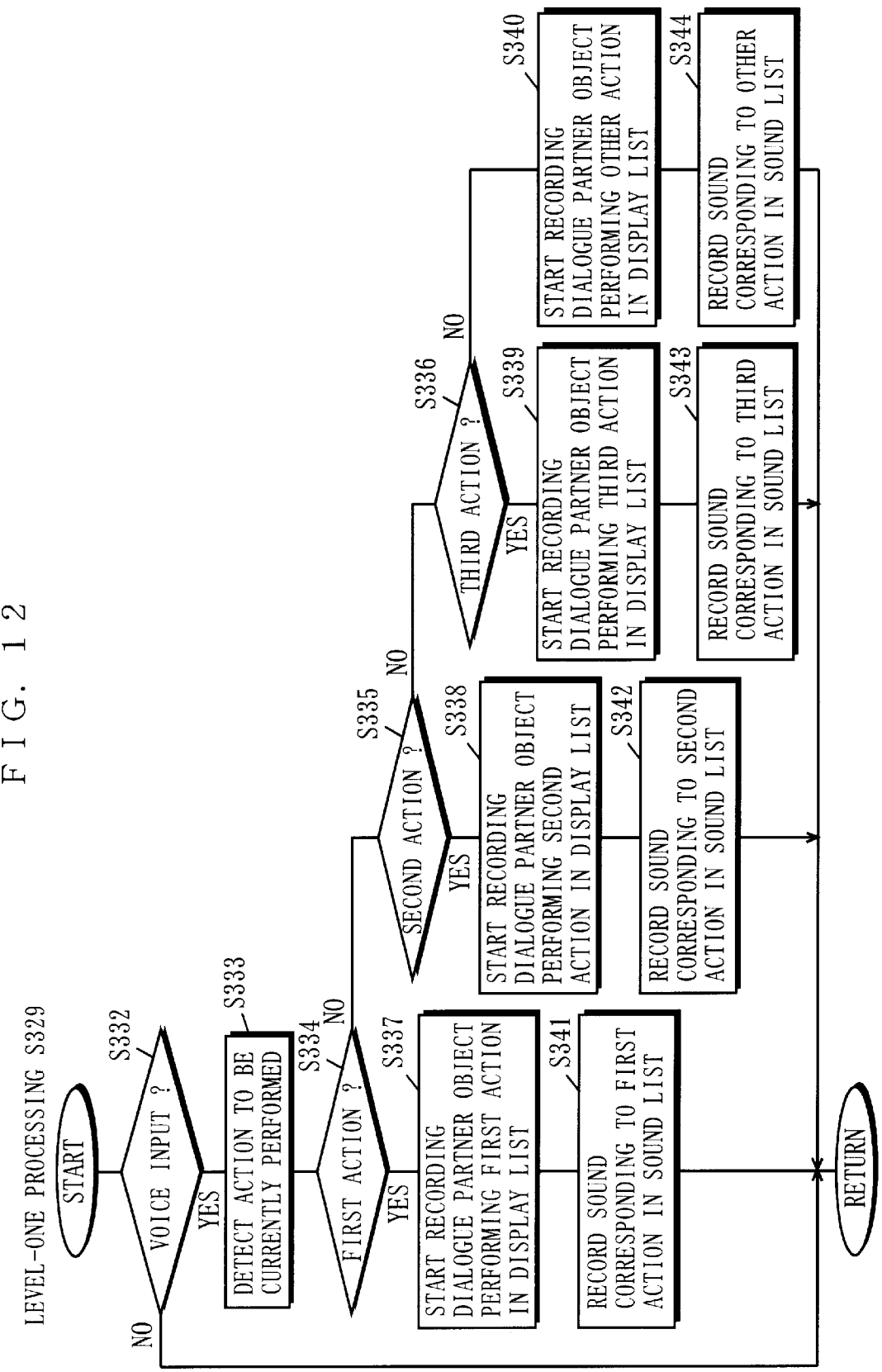
FIG. 12 is a subroutine flowchart showing detailed operation of the level-one game processing (step S329) shown in FIG. 10.
Figure 19:
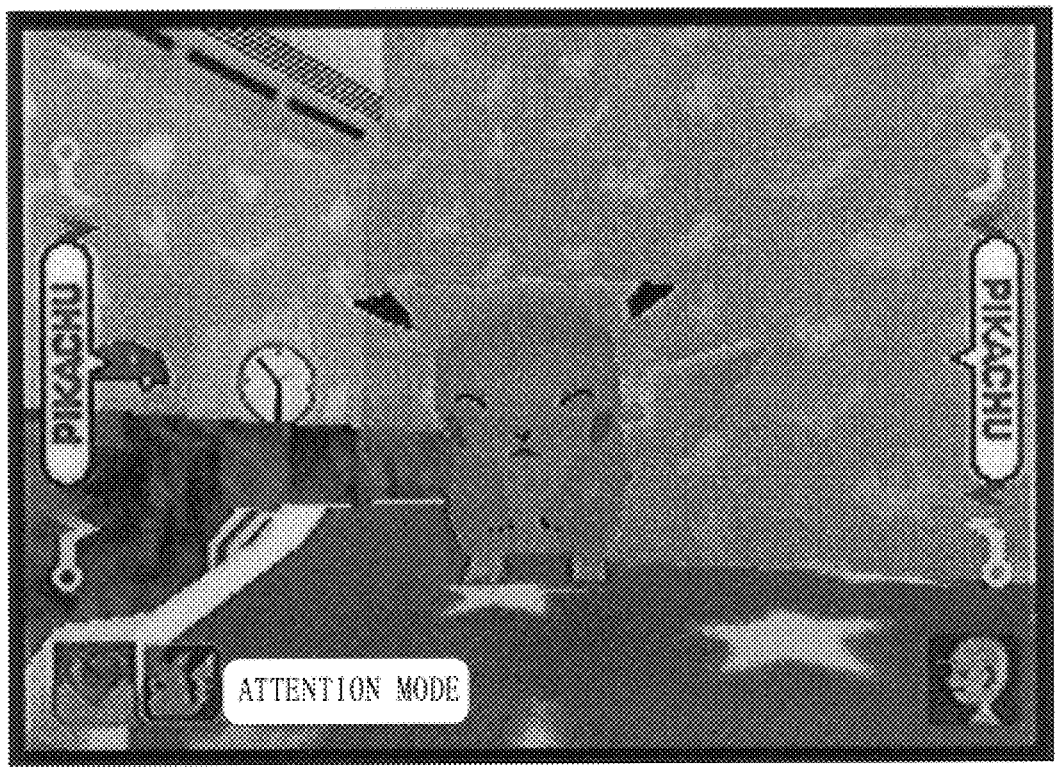
FIG. 19 is a diagram showing an example of an image displayed in the level one game processing.

Referring to FIG. 12, the CPU 11 first determines whether a speech input has been entered by the player (step S332). In the absence of a speech input, the CPU 11 does not cause the dialogue partner object to perform any action. On the other hand, when the player enters a speech input, the CPU 11 causes the dialogue partner object to perform a given action. That is to say, the CPU 11 detects the action that the dialogue partner object should currently perform (step S333). Next, the CPU 11 determines whether the detected action is a first action, a second action, a third action, or other action (steps S334 to S336). Next, the CPU 11 records display data for causing the dialogue partner object to perform the corresponding action in the display list area 150 (see FIG. 6) in the RAM 15 (steps S337 to S340). The display data recorded at this time is displayed on the display 31 in the picture drawing processing (step S5) shown in FIG. 7 that will be described later. FIG. 19 shows an example of an image displayed at this time. The CPU 11 next records speech data for causing the dialogue partner object to utter a corresponding speech in the sound list area 158 in the RAM 15 (steps S341 to 344). The speech data entered at this time is outputted from the speaker 32 in the sound processing (step S6) shown in FIG. 7 that will be described later.

Next, referring to FIG. 13, the level-two game processing will be described. In the level-two game processing, the dialogue partner object is made to perform a corresponding action in accordance with a speech input of the player. A plurality of kinds of actions are prepared on the program as actions performed by the dialogue partner object. Accordingly, to cause the dialogue partner object to perform an action that the player intends, it is necessary to enter a speech of the word corresponding to that action. When a speech input is entered from the microphone 60, a word that is the most similar to the input speech is selected from among the words recorded in the dictionary RAM 54 and compared with words corresponding to the prepared actions. When a matching word is found as the result of comparison, the action corresponding to that word is performed. When mismatching word is found, a word that is the second most similar to the input speech is selected from among the words recorded in the dictionary RAM 54, which is compared with the words corresponding to the prepared actions. When a matching word is found as the result of comparison, the action corresponding to the word is performed. When no word matches in the comparison, a process of prompting the player to enter a correct word is performed.

Figure 13:
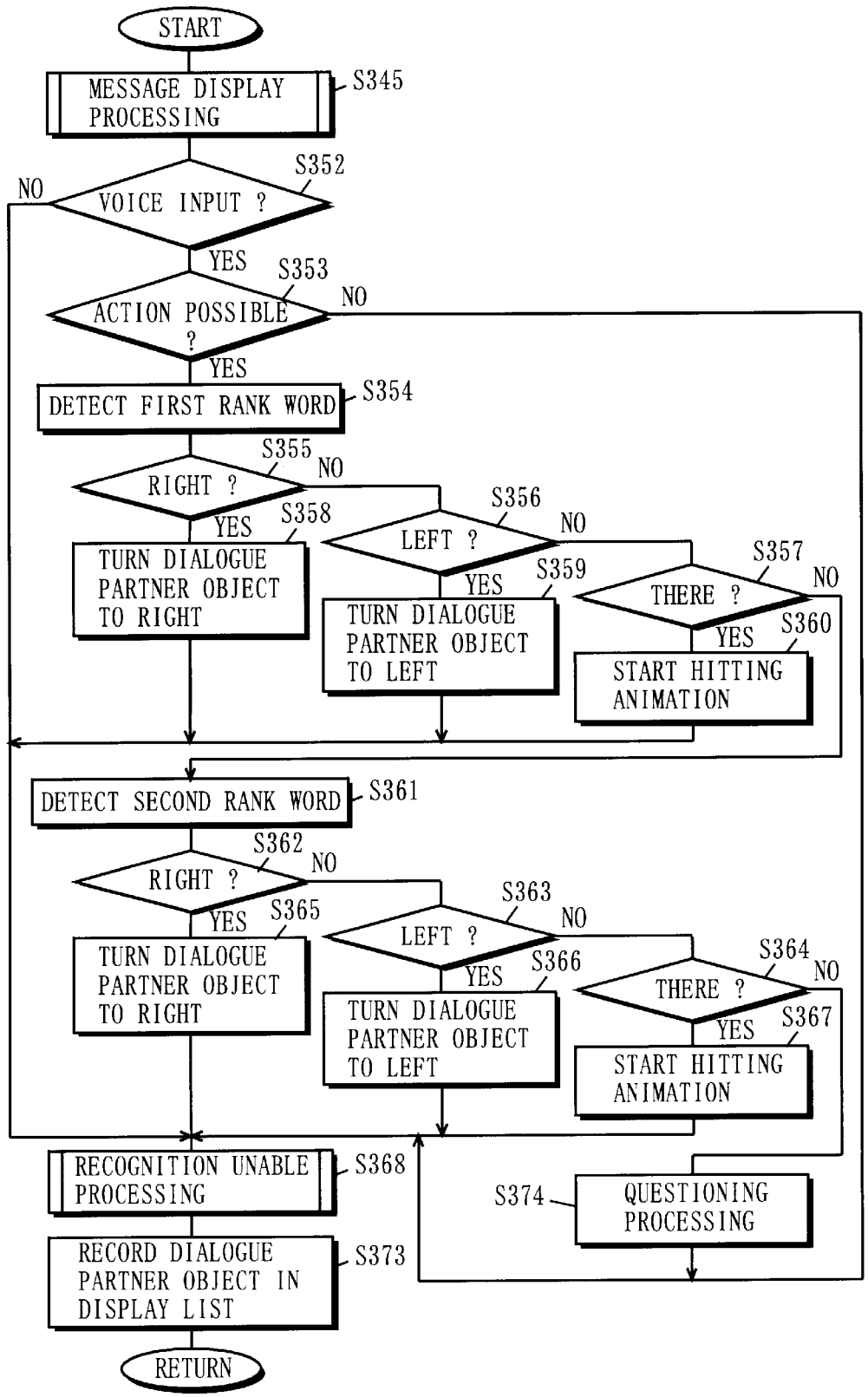
FIG. 13 is a subroutine flowchart showing detailed operation of the level-two game processing (step S330) shown in FIG. 10.
Figure 14:
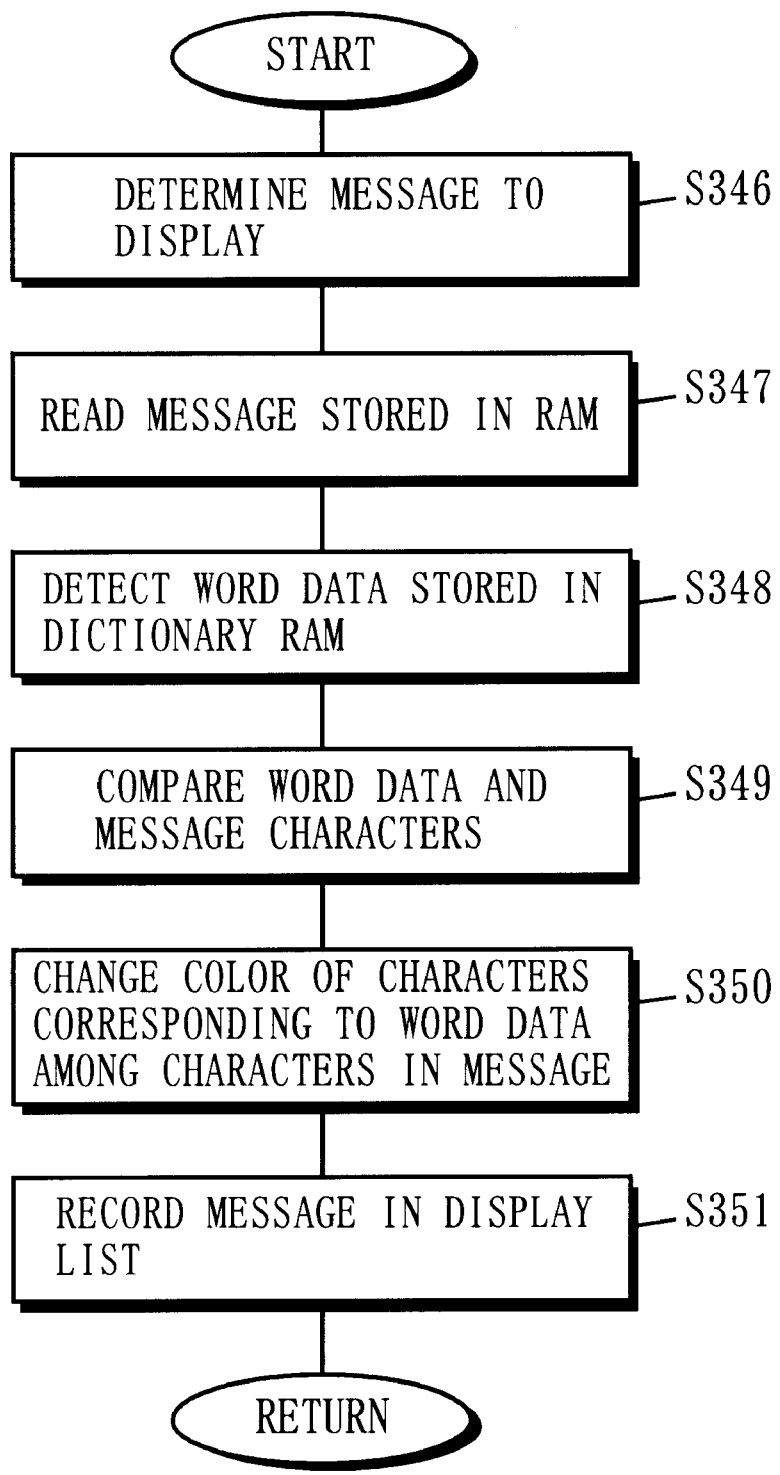
FIG. 14 is a subroutine flowchart showing detailed operation of the message display processing (step S345) shown in FIG. 13.
Figure 20:
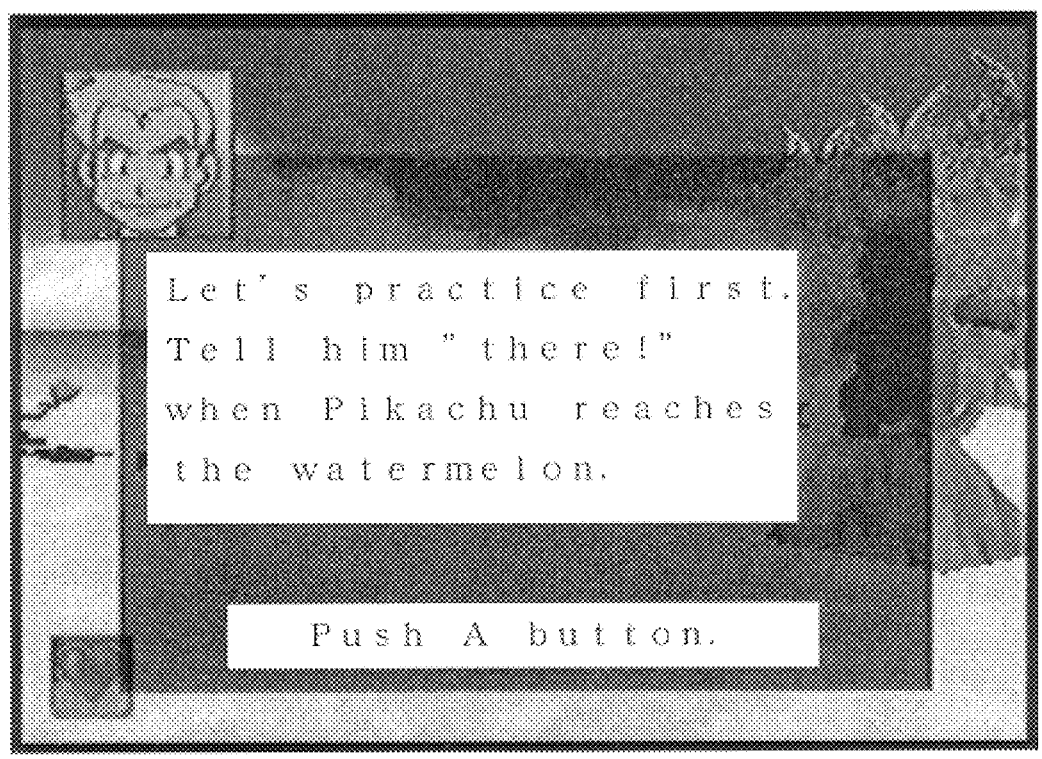
FIG. 20 is a diagram showing an example of an image displayed in the message display processing (step S345) shown in FIG. 13.
Figure 21:
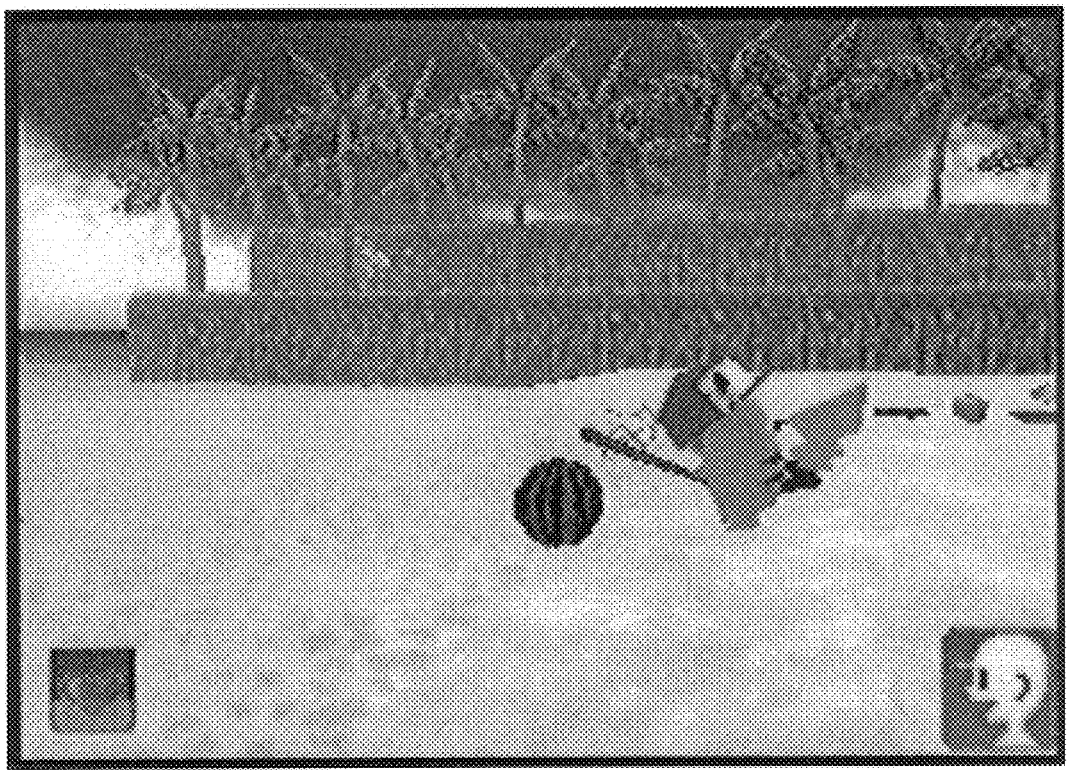
FIG. 21 is a diagram showing an example of an image displayed in a smash-the-watermelon game executed in the level-two game processing.

Referring to FIG. 13, the CPU 11 first performs a message display processing (step S345). The details of the message display processing is shown in FIG. 14. Referring to FIG. 14, the CPU 11 first determines a message to be displayed (step S346). Next the CPU 11 reads the data of the determined message from the RAM 15 (step S347). Next the CPU 11 detects all word data stored in the dictionary RAM 54 (step S348), compares the word data and the message data read from the RAM 15, and determines whether any words in the message coincide with words in the data (step S349). Next, when some words in the message data coincide with words recorded in the dictionary RAM 54, the CPU 11 corrects the color data of the message data so that the matching words are displayed in a different color from the remaining part of the message sentences (step S350). Next the CPU 11 records the color-corrected message data in the display list area 150 (see FIG. 6) in the RAM 15 (step S351). The display data recorded at this time is displayed on the display 31 in the picture drawing processing (step S5) shown in FIG. 7 that will be described later. FIG. 20 shows an example of a message displayed on the display 31. FIG. 20 shows the message "Let's practice first. Tell him 'There!'" when Pikachu reaches the watermelon." In the message, the words "Pikachu," "watermelon," and "there" are displayed in a color different from that of the remaining part of the message sentences. Thus, in the message sentences, the words recorded in the dictionary RAM 54 and the remaining part are displayed in different colors so that the player can easily know the words that can be used as inputs. Then the player does not have to repeatedly utter words at random, not knowing which words to enter, which prevents the player from losing interest in the game. In the actual game, the contents of the message displayed in step S345 will be varied as the game progresses. After step S351, the message display processing is finished and the CPU 11 returns to the level-two game processing shown in FIG. 13.

Referring to FIG. 13 again, the CPU 11 determines whether a speech input has been entered from the microphone 60 (step S352). In the presence of a speech input, the CPU 11 determines whether the dialogue partner object can perform an action in response to the speech input (step S353). For example, if the CPU 11 is executing an image processing not responsive to speech input in the series of image processing defined in the program, the CPU 11 determines that the dialogue partner object cannot perform any action in response to the speech input. Next the CPU 11 detects a word ranked first (or a word which is the most similar to the speech-input word) from the result of speech recognition made in the speech recognition unit 50 and captured in the step S326 of FIG. 8 (step S354). Next the CPU 11 determines whether the first rank word detected corresponds to any word prepared on the program (steps S355 to S357). When it corresponds to one of them, the CPU 11 computes display data for causing the dialogue partner object to perform the corresponding action (steps S358 to S360). If the word of the first rank does not correspond to any word prepared on the program, the CPU 11 detects a word ranked second (or a word that is the second most similar to the speech input word) from the result of speech recognition made in the speech recognition unit 50 and captured in the step S326 of FIG. 8 (step S361). Next the CPU 11 determines whether the second rank word detected corresponds to any word predetermined on the program (steps S362 to S364). When it corresponds to one of them, the CPU 11 computes display data for causing the dialogue partner object to perform the corresponding action (steps S365 to S367). In this embodiment, as shown in the example of screen display of FIG. 21, it is assumed that the dialogue partner object plays a game of smashing a watermelon blindfold as an example of the level-two game processing. In the smash-the-watermelon game, the dialogue partner object blindfolded moves in directions as directed by the player and brings down a stick at a position directed by the player to smash the watermelon. Therefore, for the words expected on the program, the words "right" and "left" are prepared to specify the moving direction of the dialogue partner object and the word "there" is prepared to direct the object to bring the stick down onto the watermelon. Needless to say, it is possible to add to/remove the prepared words and to adopt other words depending on the degree of progress of the game or the type of the game.

Figure 15:
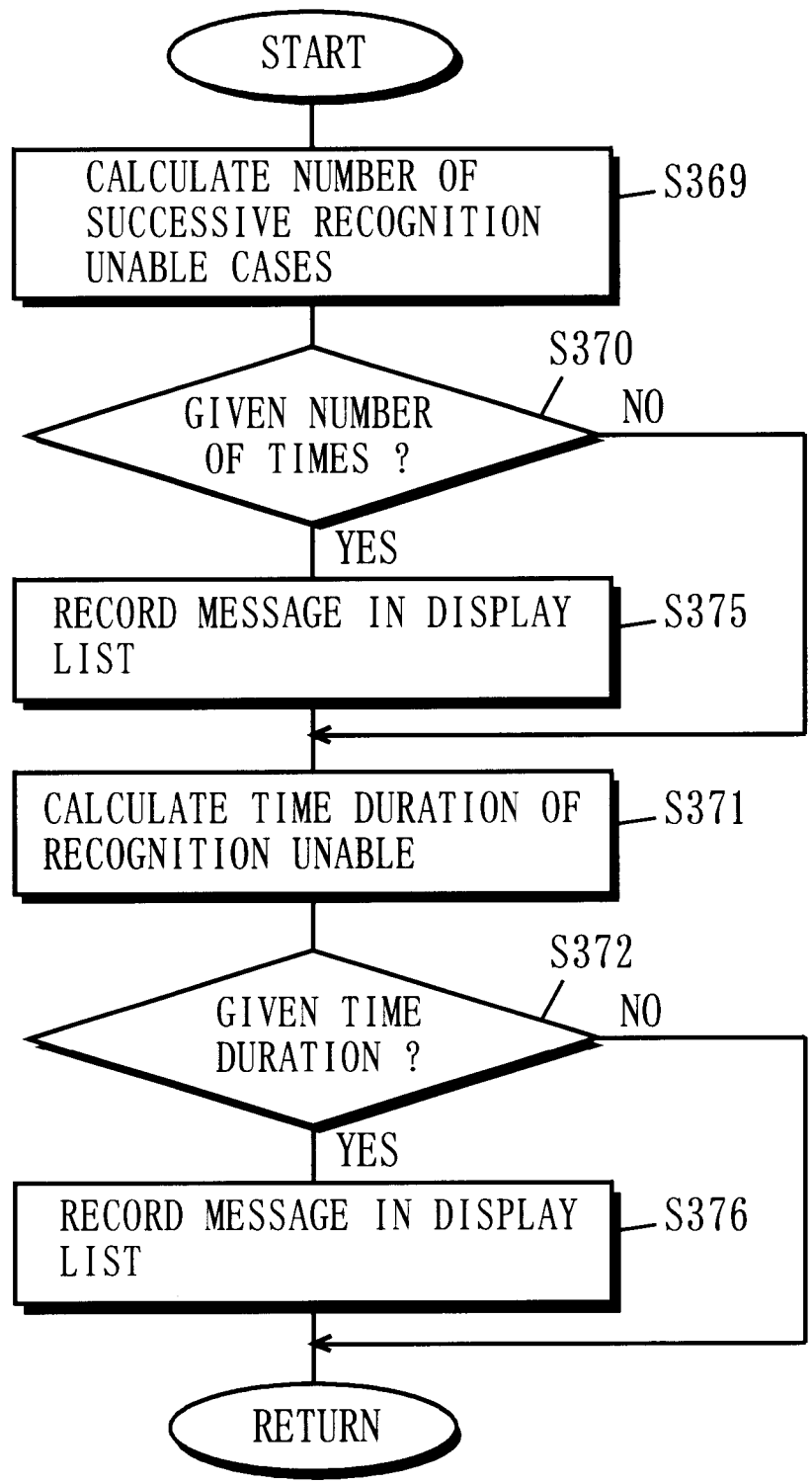
FIG. 15 is a subroutine flowchart showing detailed operation of the recognition unable processing (step S368) shown in FIG. 13.

When the process of computing the display data is completed in the steps S358 to S360, S365 to S367, the CPU 11 executes a recognition unable processing in step S368. The details of the recognition unable processing is shown in FIG. 15. Referring to FIG. 15, first, the CPU 11 calculates the number of times that the input speech could not be recognized successively (step S369). Here, "could not be recognized" means that neither the first rank word nor the second rank word corresponded to words predetermined on the program (that is, "right," "left," and "there"). In the present case, since the steps S358 to S360 or the steps S365 to S367 have been passed, the input word has been recognized and therefore the calculated number of successive recognition unable cases is zero. Accordingly the CPU 11 determines that the calculated number of successive recognition unable cases is below a predetermined number (step S370) and then calculates the duration in which recognition was impossible (step S371). The duration of time calculated in this case is zero second. Accordingly the CPU 11 determines that the calculated duration of recognition unable is below a predetermined time duration and ends the recognition unable processing in step S368. In this way, when the first rank word or the second rank word corresponds to a word expected on the program, the recognition unable processing in step S368 is passed through. After the step S368, the CPU 11 records display data computed in any of steps S358 to S360 or the steps S365 to S367 in the display list area 150 (see FIG. 6) in the RAM 15 (step S373). The display data recorded at this time is displayed on the display 31 in the picture drawing processing (step S5) shown in FIG. 7 that will be described later.

Figure 22:
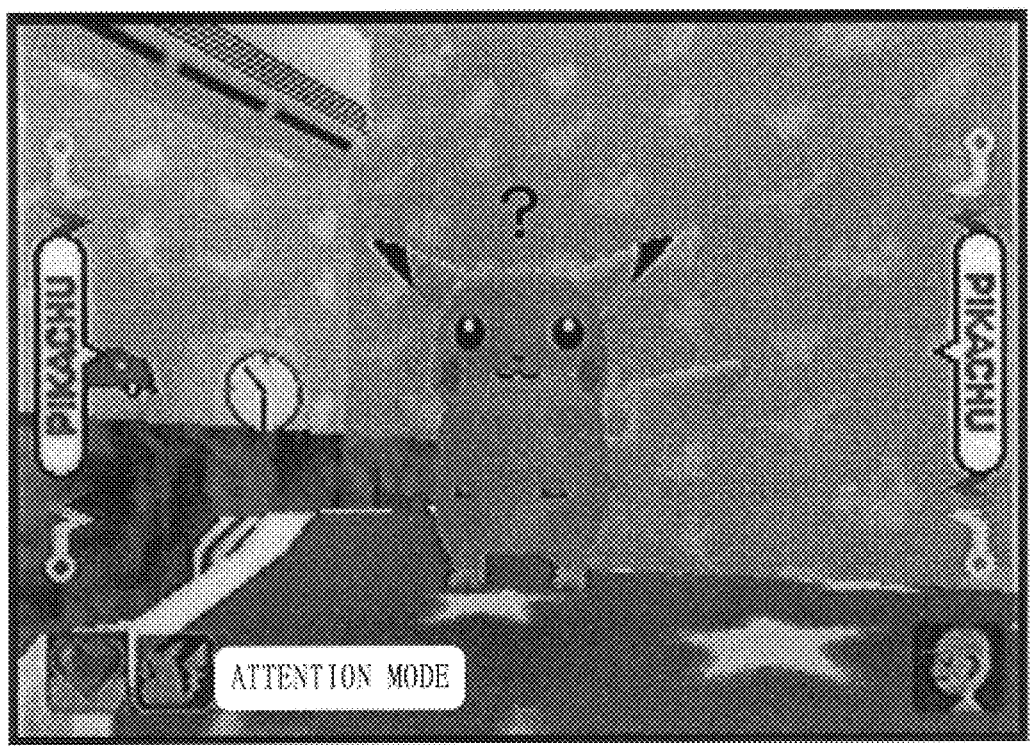
FIG. 22 is a diagram showing an example of an image displayed in the questioning processing (step S374) shown in FIG. 13.

On the other hand, when neither the first rank word nor the second rank word corresponds to any words predetermined on the program, the CPU 11 performs a questioning processing in step S374. In this questioning processing, as shown in FIG. 22, an image is displayed to show that the dialogue partner object cannot understand the entered word, for example. In FIG. 22, by way of example, a "?" mark is displayed above the head of the dialogue partner object. After that, the operation of the CPU 11 moves to the recognition unable processing in step S368.

In the recognition unable processing shown in FIG. 15, when the number of successive recognition unable cases calculated in step S369 exceeds a given number, the CPU 11 generates display data for a message to prompt the player to input an appropriate word and records the same in the display list area 150 (see FIG. 6) in the RAM 15 (step S375). The display data recorded at this time is displayed on the display 31 in the picture drawing processing (step S5) shown in FIG. 7 that will be described later. Also when the time duration of unable recognition calculated in step S371 exceeds a given time, the CPU 11 generates display data for a message to prompt the player to input an appropriate word and records the same in the display list area 150 in the RAM 15 (step S376). The recorded display data is also displayed on the display 31 in the picture drawing processing (step S5) shown in FIG. 7 that will be described later. The display data recorded in the steps S375 and S376 are in such a data form that the words expected as inputs are displayed in a different color from the remaining part, like those in the message display described referring to FIG. 14.

While words of the first and second ranks are subject to comparison with the words expected on the program in the level-two game processing, more words may be subjected to the comparison.

For another method, only the data of words supposed to be used in the current stage, field or scene may be sent and re-written from the CPU 11 to the dictionary RAM 54 every time the stage, field or scene changes. In this case, on receiving an instruction for speech recognition from the CPU 11, the DSP 521 selects a word that is the most similar to the input speech from the word data stored in the dictionary RAM 54 and sends the selected word data and its correlation distance to the CPU 11. Then the CPU 11 detects whether the correlation distance contained in the recognition result received from the DSP 521 is larger or smaller than a preset threshold; when it is smaller, the CPU 11 determines that the recognition result is correct (that is, the input speech corresponds to the word to be currently inputted), and when it is larger, it determines that the recognition result is wrong (that is, the input speech does not correspond to a word to be currently inputted). When the determination shows that the recognition result is correct, the CPU 11 causes the dialogue partner object to perform the corresponding action. When the determination shows that the recognized result is wrong, the CPU 11 performs the questioning processing in step S374 or the recognition unable processing in step S365.

Next, referring to FIG. 16, the level-three game processing will be described. In the level-three game processing, the player plays an event called a silhouette quiz, for example. The silhouette quiz means a quiz of guessing the name of a character displayed only in silhouette. The player sees a silhouette of a character displayed on the display 31 and enters the corresponding name in speech from the microphone 60. When a speech is inputted from the microphone 60, a word that is the most similar to the input speech is selected from among the words recorded in the dictionary RAM 54 and compared with the name of the character. If the comparison shows agreement, a right answer action is performed, and a wrong answer action is performed when it shows disagreement.

As described above, in the level-one game processing, the dialogue partner object is made to perform a given action determined on the program simply in response to a speech input, independently of the result of speech recognition. In the level-two game processing, words of the first and second ranks are subjected to the comparison. In contrast, in the level-three game processing, only the word of the first rank is subjected to the comparison. This means that more correct speech input of words is required as the level of the game advances. Thus the degree of difficulty of the game can be varied as the game progresses, which realizes a game of long lasting fun.

Figure 16:
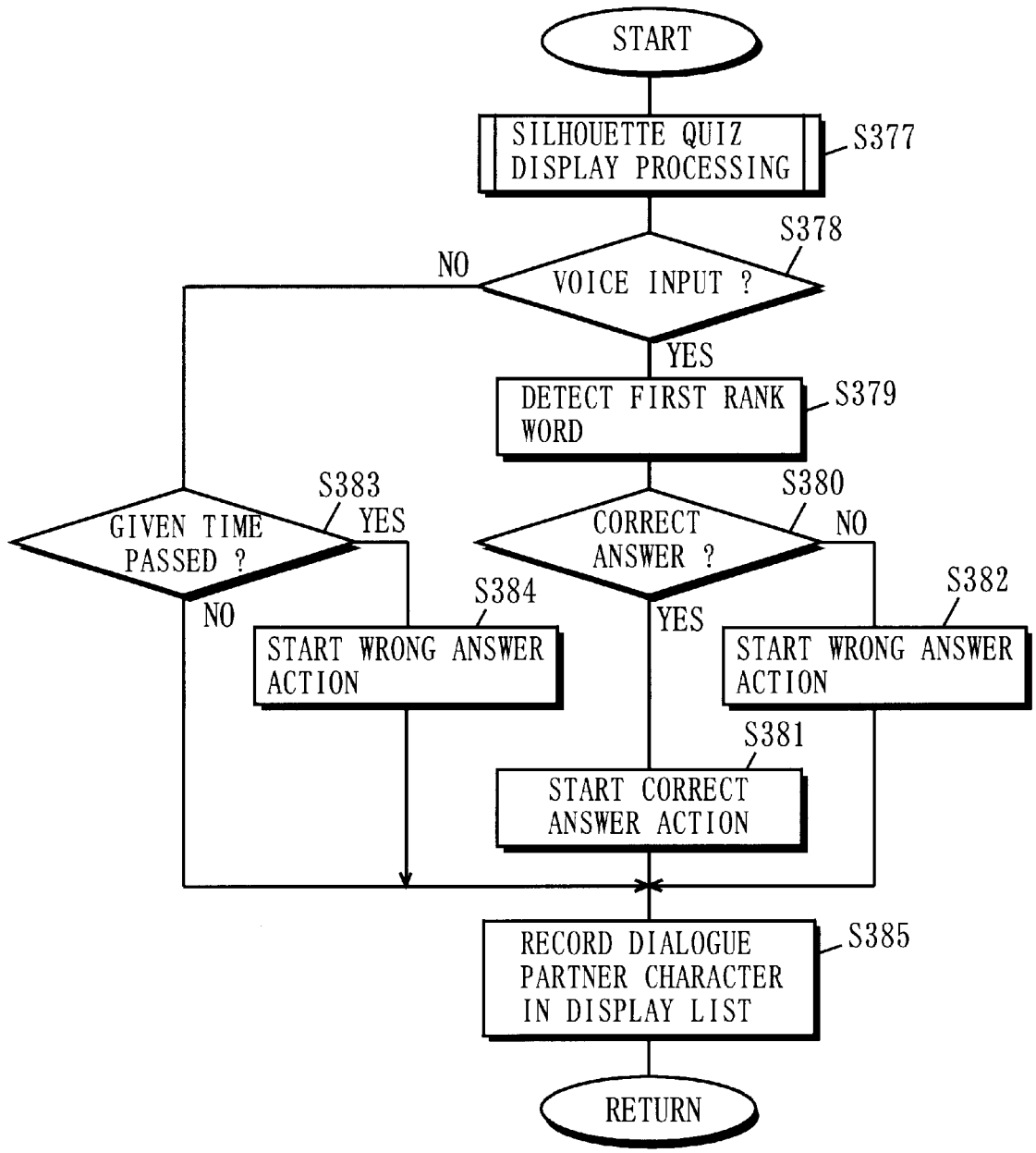
FIG. 16 is a subroutine flowchart showing detailed operation of the level-three game processing (step S331) shown in FIG. 10.
Figure 23:
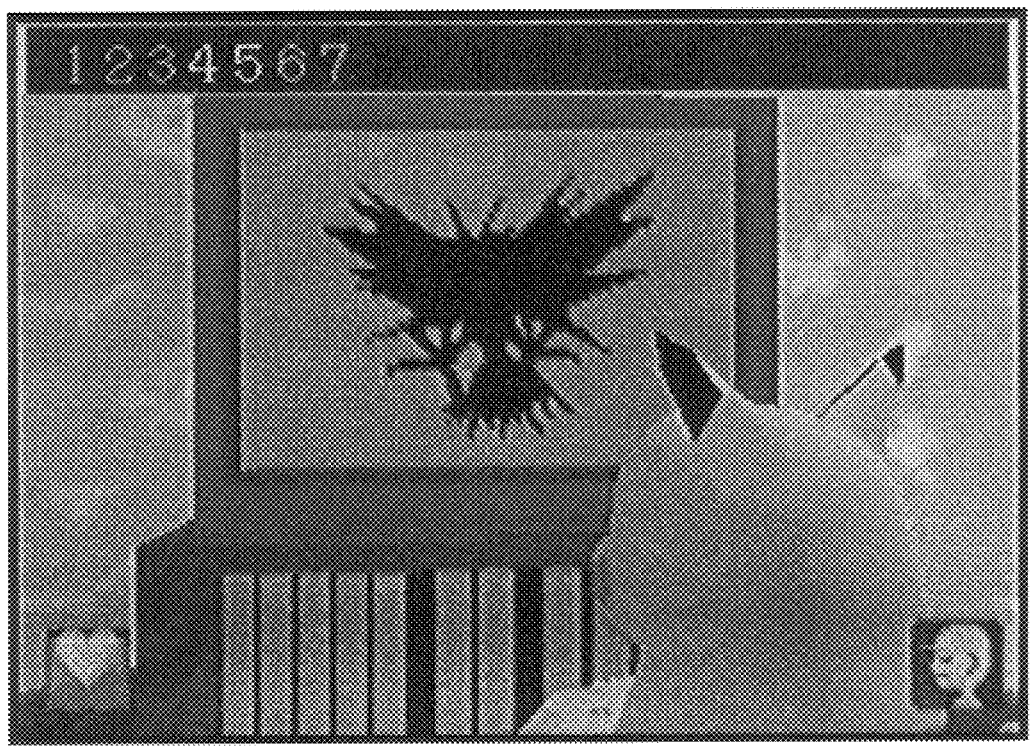
FIG. 23 is a diagram showing an example of an image displayed in a silhouette quiz executed in the level-three game processing.
Figure 24:
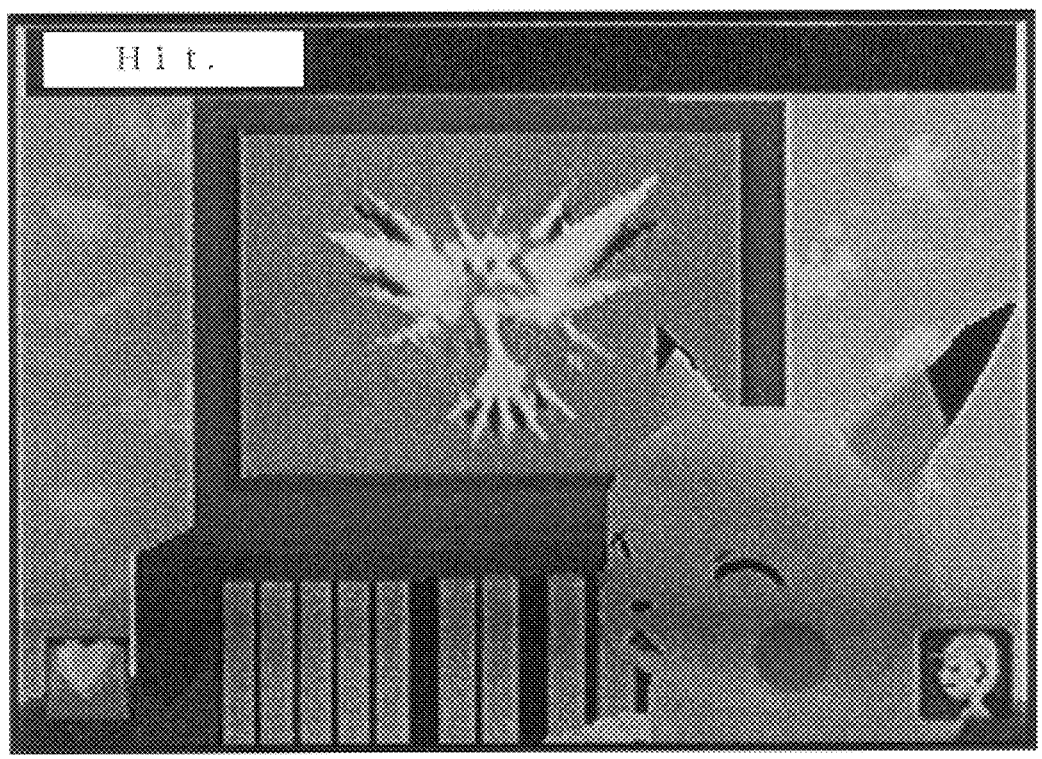
FIG. 24 is a diagram showing an example of an image displayed when a correct answer is given in the silhouette quiz executed in the level-three game processing.
Figure 25:
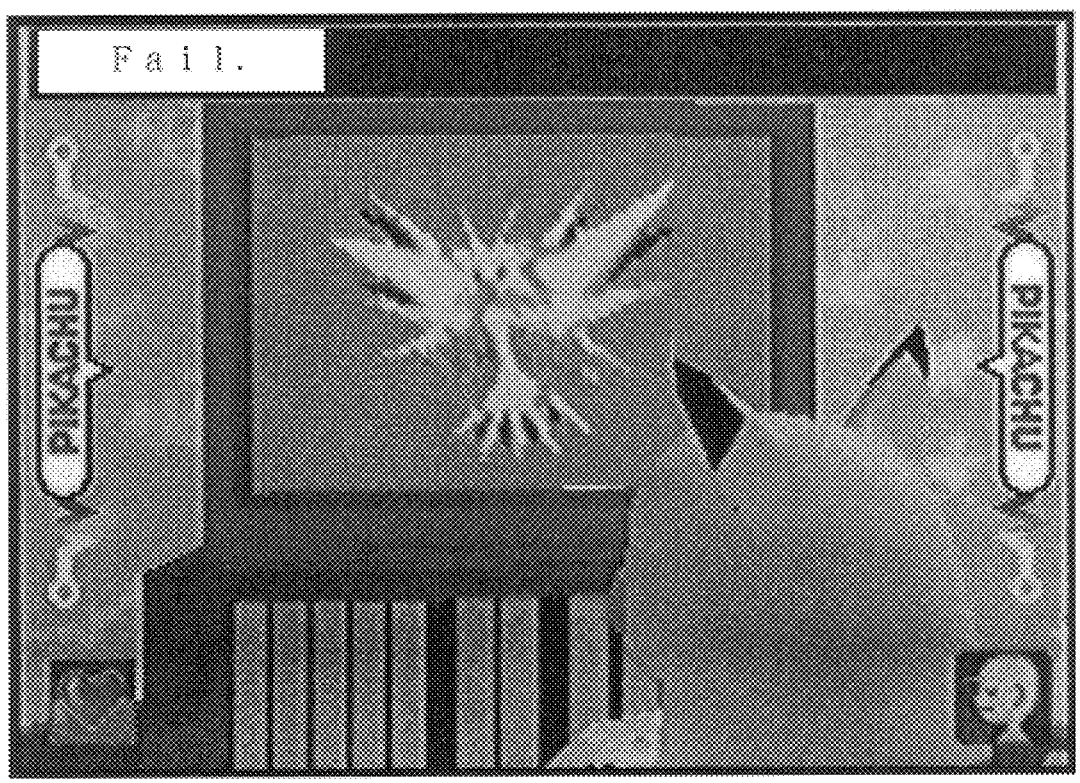
FIG. 25 is a diagram showing an example of an image displayed when a wrong answer is given in the silhouette quiz executed in the level-three-game processing.

Referring to FIG. 16, the CPU 11 first conducts a silhouette quiz display processing (step S377). FIG. 23 shows an example of display shown in the silhouette quiz display processing. As can been seen from FIG. 23, a silhouette of a character is displayed on the display 31. In response, the player inputs the name of the character corresponding to the silhouette from the microphone 60. Next the CPU 11 determines whether a speech input has been entered from the microphone 60 (step S378). When a speech input is entered, the CPU 11 detects a word ranked first (or a word that is the most similar to the speech-input word) from the speech recognition result in the speech recognition unit 50 captured in the step S326 in FIG. 8 (step S379). The CPU 11 next determines whether the first rank word detected matches the character of the currently displayed silhouette, or whether the word entered in speech is correct as the answer to the silhouette quiz (step S380). In the silhouette quiz, silhouettes of a plurality of characters are prepared and they are displayed in a random order. If the determination made in step S380 indicates a correct answer, the CPU 11 computes display data for displaying a correct answer action (step S381). If the determination made in step S380 indicates a wrong answer, the CPU 11 computes display data for displaying a wrong answer action (step S382). When absence of speech input is determined in step S378, the CPU 11 determines whether a given time has passed after the silhouette was displayed (step S383); when the given time has passed, it computes display data for displaying a wrong answer action (step S384). Next the CPU 11 records the display data computed in the step S381, S382 or S384 in the display list area 150 (see FIG. 6) in the RAM 15 (step S385). The display data recorded at this time is displayed on the display 31 in the picture drawing process (step S5) shown in FIG. 7 that will be described later. FIG. 24 shows an example of display of the correct answer action and FIG. 25 shows an example of display of the wrong answer action.

Figure 17:
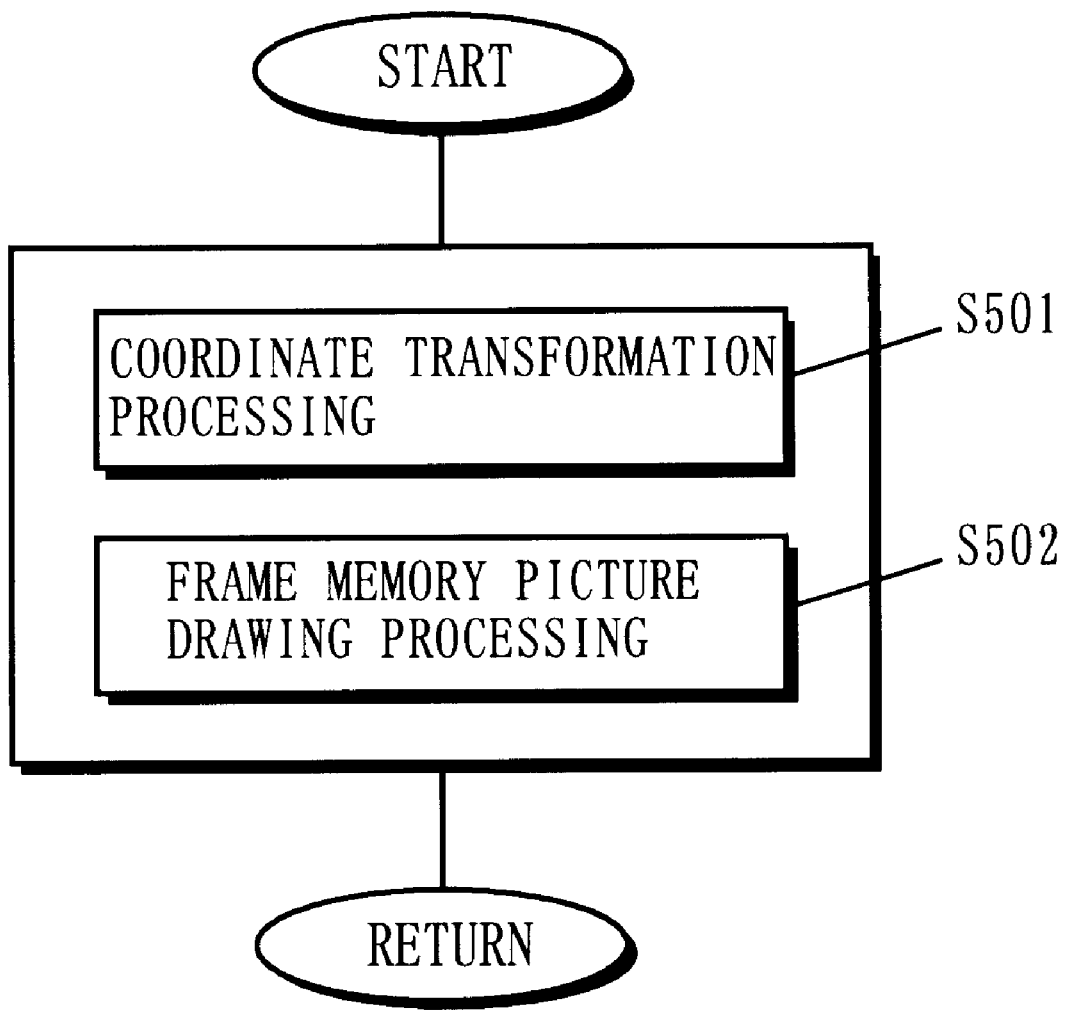
FIG. 17 is a subroutine flowchart showing detailed operation of the picture drawing processing (step S5) shown in FIG. 7.

Next, referring to FIG. 17, the details of the picture drawing processing (step S5) shown in FIG. 7 will be described. First, a coordinate transformation processing is performed in step S501. In the coordinate transformation processing, under control of the RCP 12, coordinate data of polygons corresponding to the moving objects and still objects contained in the display data stored in the display list area 150 in the RAM 15 is read from the image data area 154 and the data is transformed to coordinates based on the point of sight of the camera. More specifically, to obtain an image seen from the point of sight of the camera, the polygon data forming a plurality of moving and still objects is transformed from the absolute coordinates to the camera coordinate data. Next, in step S502, a picture drawing processing to the frame memory area 152 is performed. In this processing, color data determined on the basis of the texture data is written for each dot in the frame memory area 152, in each triangular plane in the individual objects surrounded by the polygon coordinates transformed to the camera coordinates. In this process, on the basis of the depth data for each polygon, the color data of closer objects are written so that the objects located closer (nearer) are preferentially displayed, and then the depth data corresponding to the dots in which the color data is written are written in the corresponding addresses in the Z buffer area 153. Then the flow returns to the step S6 in the main routine shown in FIG. 7.

While the operations in steps S501 and S502 are performed in a certain time period for each frame, polygons forming a plurality of objects to be displayed in one screen are sequentially processed one by one and the operation is repeated until all objects to be displayed in one screen have been processed.

Figure 18:
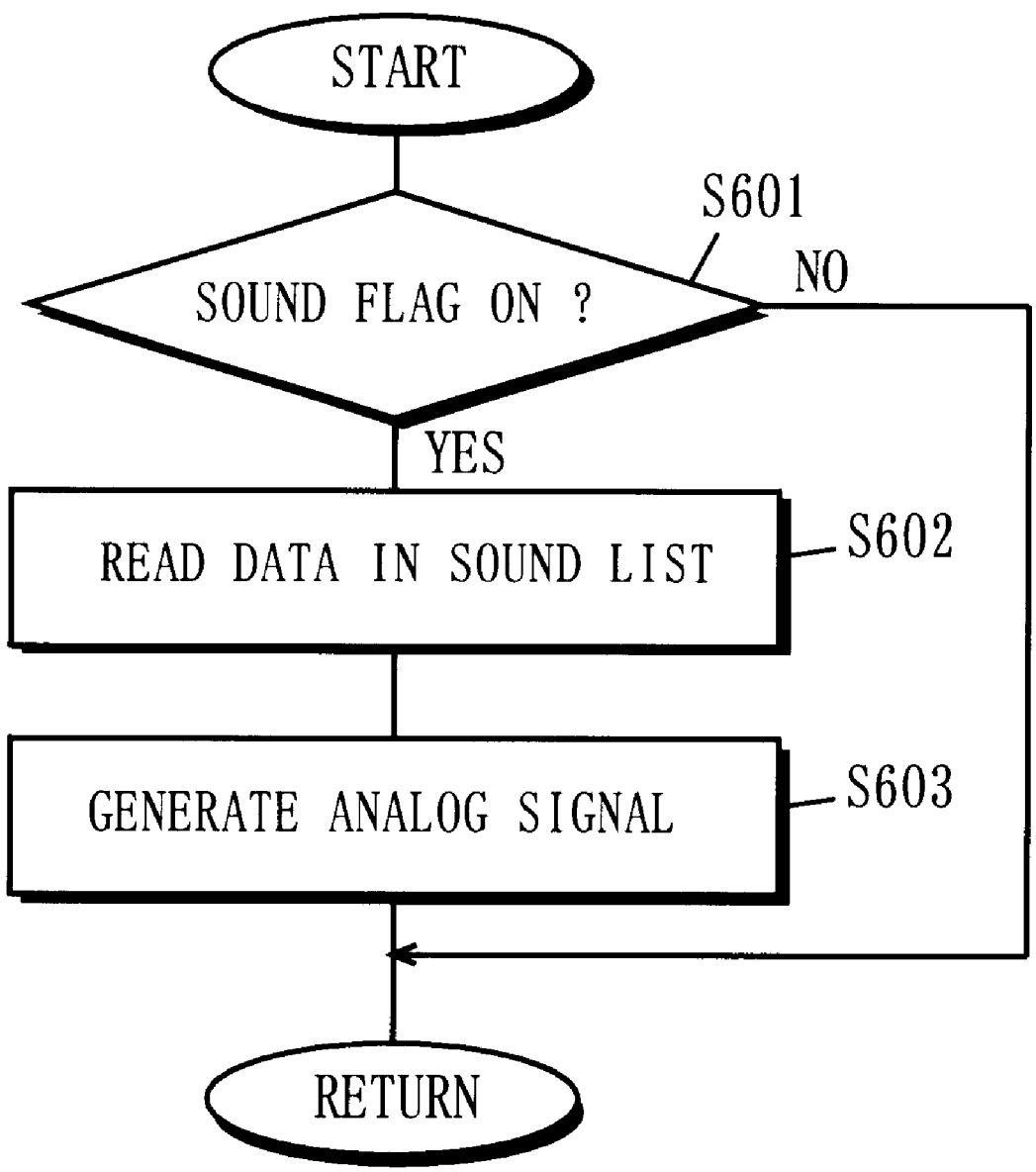
FIG. 18 is a subroutine flowchart showing detailed operation of the sound processing (step S6) shown in FIG. 7.

Next, referring to FIG. 18, the details of the sound processing (step S6) shown in FIG. 7 will be described. First in step S601, it is determined whether the sound flag is on. When the determination shows that the sound flag is on, the sound data stored in the sound list area 158 in the RAM 15 is read in step S602 and sampled digital sound data to be reproduced in one frame (1/60 sec) is outputted to a buffer (not shown). Next, in step S603, the sound generating circuit 16 converts the digital sound data stored in the

What is claimed is:

1. An image processing device for varying action of a dialogue partner object displayed on a display device in response to a spoken word input from a user through a microphone, comprising:

a converter for converting an analog speech signal inputted from said microphone to digital speech data;

a speech recognizer for recognizing a word corresponding to the digital speech data converted by said converter;

a determiner for determining whether the word recognized by said speech recognizer matches a predefined word to be inputted at that time;

a first display control controller for, when said determiner determines match of words, controlling a displayed state of said dialogue partner object to cause said dialogue partner object to perform an action corresponding to the recognized word;

a second display controller for, when said determiner determines a mismatch of words, making a determination display on said display device to deliver information on the determination made by said determiner to the user; and wherein said second display controller makes a display on said display device, as said determination display, to show that said dialogue partner object cannot understand the input word.

2. The image processing device according to claim 1, further comprising:

an input instructor for instructing to input speech; and
a controller for permitting speech input from said microphone while speech input is instructed by said input instructor.

3. The image processing device according to claim 2, wherein when speech input is not instructed by said input instructor over a given time period, said controller displays a message to prompt to instruct for speech input on said display device.

4. The image processing device according to claim 1, wherein when said determiner continuously determines a mismatch of words over a given time period, said second display controller further displays on said display device, as said determination display, a message containing a word to be inputted at that time.

5. The image processing device according to claim 1, wherein when said determiner repeatedly determines a mismatch of words for a given number of times, said second display controller further displays on said display device, as said determination display, a message containing a word to be inputted at that time.

6. The image processing device according to claim 4, wherein said second display controller controls the display on said display device so that the word to be inputted at that time and the remaining part of said message are displayed in different colors in said message.

7. The image processing device according to claim 5, wherein said second display controller controls the display on said display device so that the word to be inputted at that time and the remaining part of the message are displayed in different colors in said message.

8. A storage medium which contains program data executed in an image processing device for changing action of a dialogue partner object displayed on a display device in response to a spoken word inputted from a user through a microphone,
   wherein when executing said program data, said image processing device
   converts an analog speech signal inputted from said microphone to digital speech data,
   recognizes a word corresponding to said digital speech data converted, and
   determines whether said recognized word matches a word to be inputted at that time,
   when match of words is determined, controls a displayed state of said dialogue partner object to cause said dialogue partner object to perform an action corresponding to the recognized word,
   when mismatch of words is determined, makes a determination delivering display on said display device to deliver the result of the determination to the user; and
   wherein said second display controller makes a display on said display device, as said determination display, to show that said dialogue partner object cannot understand the input word.

9. An image processing device for displaying a given image on a display device according to a set program data and varying action of a dialogue partner object displayed on said display device in response to a spoken word input from a user through a microphone, comprising:
   a converter for converting an analog speech signal inputted from said microphone to digital speech data;
   a speech recognizer for recognizing a word corresponding to the digital speech data converted by said converter;
   a display controller for controlling a displayed state of said dialogue partner object based on a result of recognition made by said speech recognizer; and
   a degree of progress detector for detecting a degree of progress of said program data;
   wherein said display controller changes, in steps, a way of controlling the displayed state of said dialogue partner object in accordance with the degree of progress of the program data detected by said degree of progress detector;
   wherein said display controller comprises,
   first display controller for causing said dialogue partner object to perform a predetermined action independently of the word recognized by said speech recognizer when the degree of progress of the program data detected by said degree of progress detector is at a relatively elementary level, and
   a second display controller for causing said dialogue partner object to perform a corresponding action in accordance with the word recognized by said speech recognizer when the degree of progress of the program data detected by said degree of progress detector is at a relatively advanced level.

10. The image processing device according to claim 9, wherein said second display controller comprises,
    a determiner for determining whether the word recognized by said speech recognizer matches a word to be inputted at that time, and
    a corresponding action controller for, when said determiner determines match of words, causing said dialogue partner object to perform an action corresponding to the word determined as the match.

11. The image processing device according to claim 10, wherein said speech recognizer comprises;
    a dictionary in which a plurality of pieces of word data are stored for reference, a correlation distance calculator for comparing said digital speech data and each piece of the word data stored in said dictionary to calculate a correlation distance indicating a degree of similarity for each piece of the word data,
    a ranker for ranking the pieces of the word data stored in said dictionary in order of similarity, starting from the highest, on the basis of the correlation distances calculated by said correlation distance calculator, and
    a candidate word data outputter for outputting, as candidate word data, the word data of the highest rank to a given rank among the plurality of pieces of the word data stored in said dictionary to said determiner,
    and wherein said determiner determines whether the candidate word data provided from said candidate word data outputter matches a word to be inputted at that time, in order starting with the candidate word data having the highest similarity, and stops the determination operation when a match is determined and gives a match determination output to said corresponding action controller.

12. The image processing device according to claim 11, wherein said determiner reduces the number of pieces of the word data to be selected from said candidate word data and subjected to the match determination as the degree of progress of the program data detected by said degree of progress detector advances.

13. The image processing device according to claim 10, wherein said speech recognizer comprises;
    a dictionary in which word data to be inputted at that time is stored,
    a correlation distance calculator for comparing said digital speech data and each piece of the word data stored in said dictionary to calculate a correlation distance showing a degree of similarity for each piece of the word data, and a candidate word data outputter for selecting word data having the highest similarity on the basis of the correlation distances calculated by said correlation distance calculator and outputting the selected word data and its correlation distance as candidate word data to said determiner, and wherein said determiner detects whether a first similarity defined by the correlation distance contained in said candidate word data is higher than a second similarity defined by a preset threshold, and when said first similarity is higher than said second similarity, determines that the word recognized by said speech recognizer matches a word to be inputted at that time, and when said second similarity is higher than said first similarity, determines that the word recognized by said speech recognizer does not match a word to be inputted at that time.

14. A storage medium which contains program data executed in an image processing device for changing action of a dialogue partner object displayed on a display device in response to speech of a word inputted from a user through a microphone, wherein when executing said program data, said image processing device converts an analog speech signal inputted from said microphone to digital speech data, recognizes a word corresponding to said digital speech data converted, and controls a displayed state of said dialogue partner object on the basis of said recognized word, and wherein a way of controlling the displayed state of said dialogue partner object is changed in steps in accordance with a degree of progress of said program data;

wherein said display controller comprises, first display controller for causing said dialogue partner object to perform a predetermined action independently of the word recognized by said speech recognizer when the degree of progress of the program data detected by said degree of progress detector is at a relatively elementary level, and a second display controller for causing said dialogue partner object to perform a corresponding action in accordance with the word recognized by said speech recognizer when the degree of progress of the program data detected by said degree of progress detector is at a relatively advanced level.

* * * * *